US012011924B2

(12) United States Patent
Saito et al.

(10) Patent No.: US 12,011,924 B2
(45) Date of Patent: Jun. 18, 2024

(54) LIQUID EJECTION APPARATUS AND CAPACITIVE LOAD DRIVE CIRCUIT

(71) Applicant: SEIKO EPSON CORPORATION, Tokyo (JP)

(72) Inventors: Noriaki Saito, Nagano (JP); Masashi Kamiyanagi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 129 days.

(21) Appl. No.: 17/511,629

(22) Filed: Oct. 27, 2021

(65) Prior Publication Data

US 2022/0134740 A1 May 5, 2022

(30) Foreign Application Priority Data

Oct. 29, 2020 (JP) ................................ 2020-181177

(51) Int. Cl.
*B41J 2/045* (2006.01)
*B41J 2/14* (2006.01)

(52) U.S. Cl.
CPC ....... *B41J 2/04581* (2013.01); *B41J 2/04588* (2013.01); *B41J 2/04596* (2013.01); *B41J 2002/14491* (2013.01)

(58) Field of Classification Search
CPC .................................................. B41J 2/04596
See application file for complete search history.

(56) References Cited

U.S. PATENT DOCUMENTS

2005/0104913 A1* 5/2005 Sanada ................ B41J 2/04581 347/68
2012/0086755 A1* 4/2012 Sayama ................. B41J 2/0459 347/54
2016/0039203 A1 2/2016 Kamiyanagi et al.
2017/0120584 A1* 5/2017 Kondo ................. B41J 2/04596
2017/0274648 A1* 9/2017 Heijnen ................. B41J 2/0451
2019/0193394 A1* 6/2019 Suzuki ................. B41J 2/04541
2019/0351679 A1* 11/2019 Ito ........................ B41J 2/04541

FOREIGN PATENT DOCUMENTS

JP 2016-036938 A 3/2016

* cited by examiner

*Primary Examiner* — Shelby L Fidler
(74) *Attorney, Agent, or Firm* — Global IP Counselors, LLP

(57) ABSTRACT

A liquid ejection head includes a first piezoelectric element that is supplied with a first drive signal, and a second piezoelectric element that is supplied with a second drive signal, wherein the first drive signal transitions from a first potential to a second potential in a first period, maintains the second potential during a second period, and transitions from the second potential to the first potential in a third period, wherein the second drive signal transitions from a third potential to a fourth potential in a fourth period, maintains the fourth potential during a fifth period, and transitions from the fourth potential to the third potential in a sixth period, wherein the first period and the fourth period overlap, wherein the third period and the sixth period overlap, wherein the second potential is higher than the first potential, and wherein the fourth potential is lower than the third potential.

10 Claims, 16 Drawing Sheets

FIG. 13

| Sd[q1][m] | DESIGNATED CONTENTS OF Sd[q1][m] | SLa[q1][m] | | | | | SLb[q1][m] | | | SLs[q1][m] | | | | |
|---|---|---|---|---|---|---|---|---|---|---|---|---|---|---|
| | | Tu1 | Tu2 | Tu3 | | | Tu1 | Tu2 | Tu3 | Tu1 | Tu2 | Tu3 | | |
| | | | | TSS1 | TSS2 | TSS3 | | | | | | TSS1 | TSS2 | TSS3 |
| (1, 1, 0) | LARGE DOT | H | L | L | L | L | L | L | L | L | L | L | L | L |
| (1, 0, 0) | SMALL DOT | L | L | L | L | L | H | L | L | L | L | L | L | L |
| (0, 1, 1) | FIRST MICRO-VIBRATION WAVEFORM | L | H | L | L | L | L | L | L | L | L | L | L | L |
| (0, 0, 1) | SECOND MICRO-VIBRATION WAVEFORM | L | L | L | L | L | L | H | L | L | L | L | L | L |
| (1, 1, 1) | DETERMINATION TARGET | L | L | H | L | H | L | L | L | L | L | L | H | L |

FIG. 14

| Sd[q2][m] | DESIGNATED CONTENTS OF Sd[q2][m] | SLa[q2][m] | | | | | SLb[q2][m] | | | SLs[q2][m] | | | | |
|---|---|---|---|---|---|---|---|---|---|---|---|---|---|---|
| | | Tu1 | Tu2 | | | Tu3 | Tu1 | Tu2 | Tu3 | Tu1 | Tu2 | | | Tu3 |
| | | | TSS4 | TSS5 | TSS6 | | | | | | TSS4 | TSS5 | TSS6 | |
| (1, 1, 0) | LARGE DOT | H | L | L | L | L | L | L | L | L | L | L | L | L |
| (1, 0, 0) | SMALL DOT | L | L | L | L | L | H | L | L | L | L | L | L | L |
| (0, 1, 1) | FIRST MICRO-VIBRATION WAVEFORM | L | L | L | L | H | L | L | L | L | L | L | L | L |
| (0, 0, 1) | SECOND MICRO-VIBRATION WAVEFORM | L | L | L | L | L | L | L | H | L | L | L | L | L |
| (1, 1, 1) | DETERMINATION TARGET | L | H | L | H | L | L | L | L | L | L | H | L | L |

FIG. 15

| Info-S | Info-T | Stt |
|---|---|---|
| 1 | NTc < Tth1 | 2 : EJECTION ABNORMALITY DUE TO AIR BUBBLES |
| | Tth1 ≤ NTc ≤ Tth2 | 1 : NORMAL |
| | Tth2 < NTc ≤ Tth3 | 3 : EJECTION ABNORMALITY DUE TO FOREIGN MATTER |
| | Tth3 < NTc | 4 : EJECTION ABNORMALITY DUE TO THICKENING |
| 0 | N/A | 5 : EJECTION ABNORMALITY |

LIQUID EJECTION APPARATUS AND CAPACITIVE LOAD DRIVE CIRCUIT

The present application is based on, and claims priority from JP Application Serial Number 2020-181177, filed Oct. 29, 2020, the disclosure of which is hereby incorporated by reference herein in its entirety.

BACKGROUND

1. Technical Field

The present disclosure relates to a liquid ejection apparatus and a capacitive load drive circuit.

2. Related Art

In the related art, a liquid ejection apparatus that ejects a liquid such as ink has been known. For example, JP-A-2016-36938 describes a liquid ejection apparatus that includes a head unit including a plurality of piezoelectric elements and ejects a liquid by supplying a drive signal to each of the plurality of piezoelectric elements.

However, in the related art technique, the noise generated by the potential change of the drive signal supplied to the head unit may affect the signal supplied to the head unit or the signal acquired from the head unit.

SUMMARY

According to an aspect of the present disclosure, a liquid ejection apparatus includes a first piezoelectric element that is actuated according to a supply of a first drive signal, and a second piezoelectric element that is actuated according to a supply of a second drive signal, wherein the first drive signal transitions from a first potential to a second potential in a first period, maintains the second potential during a second period following the first period, and transitions from the second potential to the first potential in a third period following the second period, wherein the second drive signal transitions from a third potential to a fourth potential in a fourth period, maintains the fourth potential during a fifth period following the fourth period, and transitions from the fourth potential to the third potential in a sixth period following the fifth period, wherein the first period and the fourth period overlap with each other in part or in whole, wherein the third period and the sixth period overlap with each other in part or in whole, wherein the second potential is higher than the first potential, and wherein the fourth potential is lower than the third potential.

According to another aspect of the present disclosure, a capacitive load drive circuit includes a first piezoelectric element that is actuated according to a supply of a first drive signal, and a second piezoelectric element that is actuated according to a supply of a second drive signal, wherein the first drive signal transitions from a first potential to a second potential in a first period, maintains the second potential during a second period following the first period, and transitions from the second potential to the first potential in a third period following the second period, wherein the second drive signal transitions from a third potential to a fourth potential in a fourth period, maintains the fourth potential during a fifth period following the fourth period, and transitions from the fourth potential to the third potential in a sixth period following the fifth period, wherein the first period and the fourth period overlap with each other in part or in whole, wherein the third period and the sixth period overlap with each other in part or in whole, wherein the second potential is higher than the first potential, and wherein the fourth potential is lower than the third potential.

BRIEF DESCRIPTION OF THE DRAWINGS

FIG. 13 is an explanatory diagram for explaining the generation of a coupling state designation signal in a decoder.

FIG. 14 is an explanatory diagram for explaining the generation of a coupling state designation signal in the decoder.

FIG. 15 is an explanatory diagram for explaining the generation of determination information Stt in an ejection state determination circuit.

DESCRIPTION OF EXEMPLARY EMBODIMENTS

Hereinafter, embodiments for carrying out the present disclosure will be described with reference to the drawings. However, in each figure, the size and scale of each part are appropriately changed from the actual ones. In addition, since the embodiments described below are preferable specific examples of the present disclosure, there are various technically preferred limitations. However, the scope of the present disclosure is not limited to these embodiments unless otherwise specified in the following description.

1. Embodiments

In the present embodiment, a liquid ejection apparatus will be described by exemplifying an ink jet printer 1 that ejects ink to form an image on recording paper P. The ink jet printer 1 is an example of a "liquid ejection apparatus". Ink is an example of a "liquid". The recording paper P is an example of a "medium".

1.1. Overview of Ink Jet Printer 1

Figure 1:
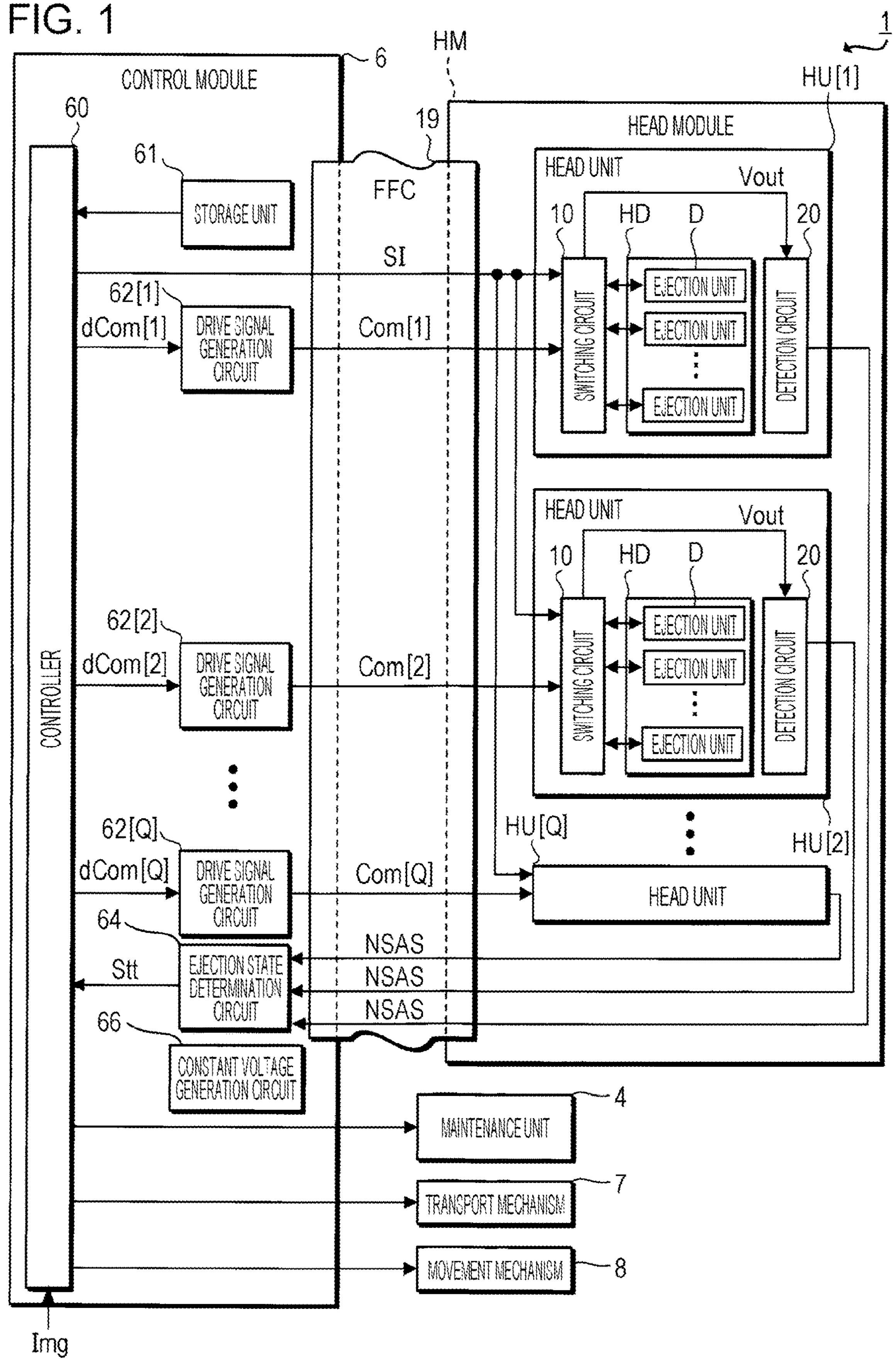
FIG. 1 is a functional block diagram showing an example of the configuration of an ink jet printer according to the present embodiment.
Figure 2:
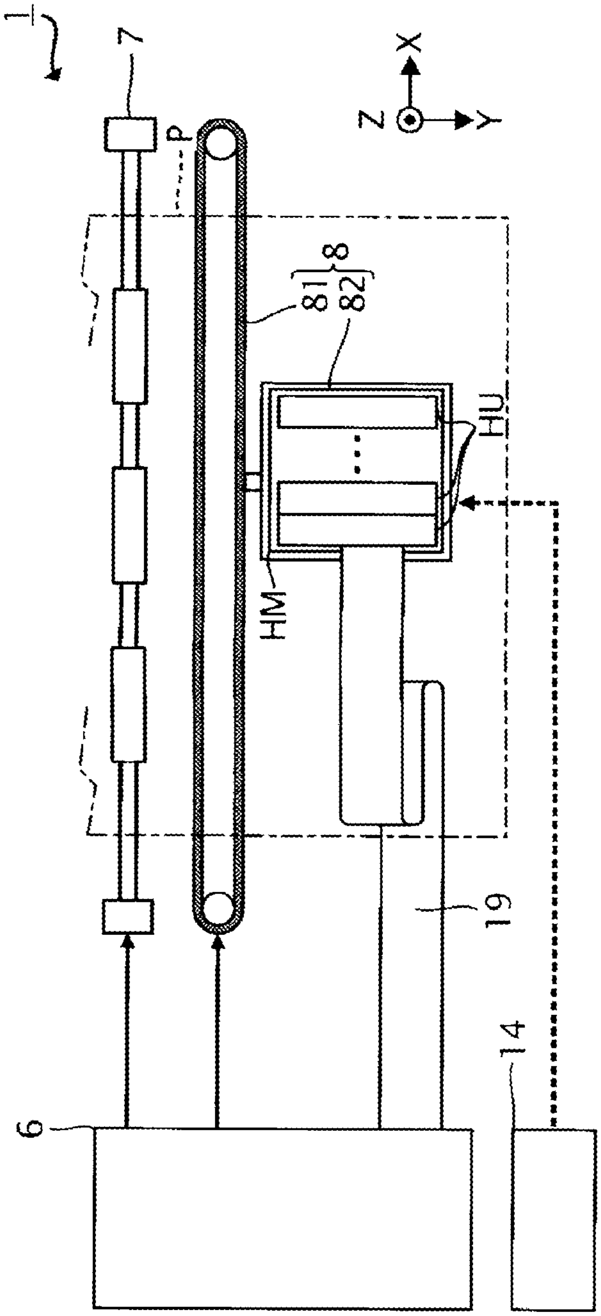
FIG. 2 is a schematic diagram illustrating the ink jet printer.

The configuration of the ink jet printer 1 according to the present embodiment will be described with reference to FIGS. 1 and 2. Here, FIG. 1 is a functional block diagram showing an example of the configuration of the ink jet printer 1 according to the present embodiment. Further, FIG. 2 is a schematic diagram illustrating the ink jet printer 1.

The ink jet printer 1 is supplied with print data Img indicating an image to be formed by the ink jet printer 1 and information indicating the number of copies of the image to be formed by the ink jet printer 1 from a host computer such as a personal computer or a digital camera. The ink jet printer 1 executes a printing process of forming an image indicated by print data Img supplied from the host computer on the recording paper P.

As illustrated in FIG. 1, the ink jet printer 1 includes a head module HM including Q head units HU each including an ejection unit D that ejects ink, a maintenance unit 4, a control module 6 that controls the operation of respective units of the ink jet printer 1 and a transport mechanism 7 that transports the recording paper P, and a moving mechanism 8 that moves the head module HM. Q is an even number of 2 or more. In the following, in order to distinguish the Q head units HU, they may be referred to as a first stage, a second stage, . . . , a Q-th stage in order. Further, the q-th stage head unit HU may be referred to as a head unit HU[q]. The variable q is an integer of one or more and Q or less. Further, when the component or signal of the ink jet printer 1 corresponds to the variable q of the head unit HU[q], the code for representing the component or signal may have a subscript[q] indicating the code corresponds to the q-th stage.

The control module 6 includes a controller 60, a storage unit 61, Q drive signal generation circuits 62 having a one-to-one correspondence with the Q head units HU, an ejection state determination circuit 64 that determines the ejection state of the nozzles N included in the head units HU, and a constant voltage generation circuit 66. The controller 60 includes a CPU. The CPU is an abbreviation for the central processing unit. However, the controller 60 may include a programmable logic device such as an FPGA instead of the CPU. The FPGA is an abbreviation for the field programmable gate array. The storage unit 61 stores the control program of the ink jet printer 1 and other information.

In the present embodiment, each head unit HU includes a recording head HD including M ejection units D, a switching circuit 10, and a detection circuit 20. In the embodiment, M is an integer of 2 or more. In the following, in order to distinguish each of the M ejection units D included in the head unit HU[q], they may be referred to as a first stage, a second stage, . . . , an M-th stage in order. Further, the m-th stage ejection unit D provided in the head unit HU[q] may be referred to as an ejection unit D[q][m]. The variable m is an integer of one or more and M or less. Further, when the component or signal of the ink jet printer 1 corresponds to the m-th stage of the ejection unit D[q][m], the code for representing the component or signal may have a subscript [m] indicating that the code corresponds to the m-th stage.

The controller 60 generates a designation signal SI for controlling the head module HM, a waveform designation signal dCom[q] for controlling a drive signal generation circuit 62[*q*], and a signal for controlling the transport mechanism 7, and a signal for controlling the moving mechanism 8. The waveform designation signal dCom[q] is a digital signal that defines the waveform of a drive signal Com[q]. The drive signal Com[q] is an analog signal for actuating the ejection unit D[q][m].

The drive signal generation circuit 62[*q*] includes a DA conversion circuit and generates the drive signal Com[q] having a waveform defined by the waveform designation signal dCom[q]. In the present embodiment, it is assumed that the drive signal Com[q] includes a drive signal ComA [q] and a drive signal ComB[q]. For example, the drive signal generation circuit 62[*q*] generates the drive signal ComA[q] and the drive signal ComB[q] by two independent circuits internally.

The ejection state determination circuit 64 generates determination information Stt[q][m] indicating the result of the ejection state determination of the ejection unit D[q][m] based on a residual vibration signal NSAS[q][m]. The residual vibration signal NSAS[q][m] is an example of a "detection signal". In the following, the ejection unit D whose ejection state is determined by the ejection state determination circuit 64 may be referred to as a "determination target ejection unit D-H". Further, the determination target ejection unit D-H in the head unit HU[q] may be referred to as a "determination target ejection unit D[q]-H". Further, a series of processes, executed by the ink jet printer 1, including an ejection state determination executed by the ejection state determination circuit 64 and a preparatory process for the ejection state determination circuit 64 to execute the ejection state determination are referred to as an ejection state determination process.

Figure 7:
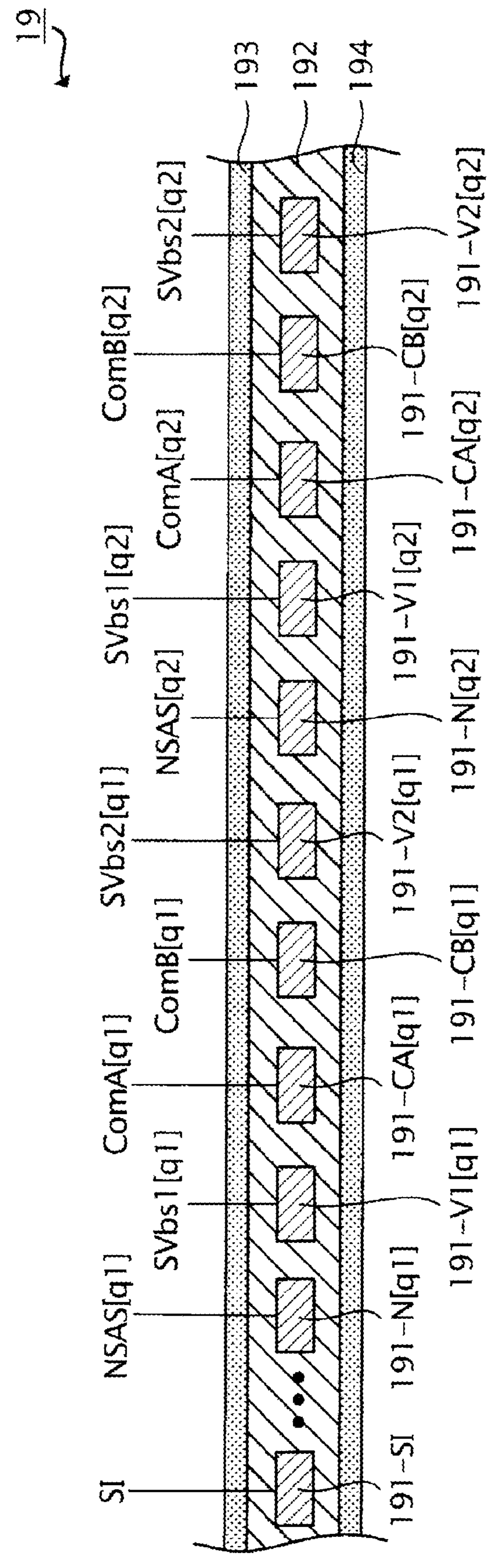
FIG. 7 is a diagram showing the wiring arrangement of an FFC.

The constant voltage generation circuit 66 generates a constant potential signal SVbs illustrated in FIG. 7. The constant potential signal SVbs has a constant potential Vbs. The constant voltage generation circuit 66 generates Q constant potential signals SVbs corresponding to the respective head units HU. Although omitted in FIG. 1 in order to avoid complication of the figure, the constant voltage generation circuit 66 supplies Q constant potential signals SVbs to each of the head units HU.

A switching circuit 10[*q*] switches whether to supply the drive signal Com[q] output from the drive signal generation circuit 62[*q*] to each ejection unit D[q][m]. Further, the switching circuit 10[*q*] switches whether to electrically couple each ejection unit D and the detection circuit 20.

A detection circuit 20[*q*] generates the residual vibration signal NSAS[q][m] indicating the residual vibration remaining in the ejection unit D[q][m] after the ejection unit D[q][m] is actuated based on a detection signal Vout[q][m] detected from the ejection unit D[q][m] actuated by the drive signal Com[q].

In the embodiment, it is assumed that the ink jet printer 1 is a serial printer. Specifically, as shown in FIG. 2, the ink jet printer 1 executes the printing process by ejecting ink from the ejection unit D while transporting the recording paper P in the sub-scanning direction and moving the head module HM in the main scanning direction. In the present embodiment, as shown in FIG. 2, the +X direction and the −X direction opposite to the +X direction are the main scanning directions, and the +Y direction is the sub-scanning direction. Hereinafter, the +X direction and the −X direction are collectively referred to as the "X axis direction", and hereinafter, the +Y direction and the −Y direction, which is the opposite direction of the +Y direction, is collectively referred to as the "Y axis direction".

The transport mechanism 7 transports the recording paper P in the +Y direction. Specifically, the transport mechanism 7 includes a transport roller (not shown) whose rotation shaft is parallel to the X axis direction, and a motor (not shown) that rotates the transport roller under the control of the control module 6.

The moving mechanism 8 reciprocates the head module HM along the X axis under the control of the control module 6. As illustrated in FIG. 2, the moving mechanism 8 includes a substantially box-shaped transport body 82 that accommodates the head module HM, and an endless belt 81 to which the transport body 82 is fixed.

The maintenance unit 4 executes a maintenance process for normally recovering the ink ejection state of the ejection unit D when the ink ejection state of the ejection unit D is abnormal. The maintenance unit 4 includes a cap (not shown) that covers each head unit HU so that the nozzle N of the ejection unit D is sealed, a wiper (not shown) that wipes off foreign matter such as paper dust attaching to the vicinity of the nozzle N of the ejection unit D, a tube pump (not shown) that sucks ink, air bubbles, and the like in the ejection unit D, and a discharged ink receiving unit (not shown) that receives the discharged ink when the ink in the ejection unit D is discharged.

Further, as illustrated in FIG. 2, the ink jet printer 1 includes a liquid container 14 that stores ink. Examples of the liquid container 14 include a cartridge that can be attached to and detached from the ink jet printer 1, a bag-shaped ink pack made of a flexible film, an ink tank that can be refilled with ink, or the like. A plurality of types of ink having different colors is stored in the liquid container 14.

The storage unit 61 includes a volatile memory such as a RAM and a nonvolatile memory such as ROM, an EEPROM, or a PROM, and stores various pieces of information such as print data Img supplied from the host computer and a control program of the ink jet printer 1. The RAM is an abbreviation for the random access memory. The ROM is an abbreviation for the read only memory. The EEPROM is an abbreviation for the electrically erasable programmable read-only memory. The PROM is an abbreviation for the programmable ROM.

Further, as illustrated in FIGS. 1 and 2, the head unit HU is coupled to the FFC 19. The FFC is an abbreviation for the flexible flat cable, which means a flexible flat cable. The FFC 19 includes the wiring for supplying signals to each head unit HU and the wiring for supplying the residual vibration signal NSAS[q][m] supplied from each head unit HU to the ejection state determination circuit 64. The wiring for supplying signals to each head unit HU is, for example, a plurality of wires for supplying the drive signal Com[q], the constant potential signal SVbs, and the designation signal SI to each head unit HU.

The designation signal SI is a digital signal for designating the type of operation of the ejection unit D. Specifically, the designation signal SI designates the type of operation of the ejection unit D by designating whether to supply the drive signal Com to the ejection unit D. Here, designating the type of operation of the ejection unit D refers to, for example, designating whether to drive the ejection unit D, designating whether ink is ejected from the ejection unit D when the ejection unit D is driven, and designating the amount of ink ejected from the ejection unit D when the ejection unit D is driven.

When the printing process is executed, the controller 60 first stores the print data Img supplied from the host computer in the storage unit 61. Next, the controller 60 generates various control signals such as a designation signal SI, a waveform designation signal dCom, a signal for controlling the transport mechanism 7, and a signal for controlling a moving mechanism 8 based on various pieces of data such as the print data Img stored in the storage unit 61. Then, the controller 60 causes the transport mechanism 7 and the moving mechanism 8 to change the relative position of the recording paper P with respect to the head module HM based on various control signals, and causes the head module HM to actuate the ejection unit D. As a result, the controller 60 adjusts the presence/absence of ink ejection from the ejection unit D, the ink ejection amount, the ink ejection timing, and the like, and controls the execution of the printing process for forming an image corresponding to the print data Img on the recording paper P.

As described above, the ink jet printer 1 according to the present embodiment executes the ejection state determination process for determining whether the ink ejection state from each ejection unit D is normal, that is, whether an ejection abnormality has occurred in each ejection unit D. The ejection abnormality is a state in which even when the ejection unit D is actuated by the drive signal Com to eject ink from the ejection unit D, the ink cannot be ejected according to the mode defined by the drive signal Com. Here, the ink ejection mode defined by the drive signal Com is that the ejection unit D ejects an amount of ink specified by the waveform of the drive signal Com, and the ejection unit D ejects the ink at an ejection speed specified by the waveform of the drive signal Com. That is, examples of the state in which the ink cannot be ejected in the ink ejection mode defined by the drive signal Com include, in addition to the state in which the ink cannot be ejected from the ejection unit D, a state in which the amount of ejected ink that is smaller than the amount of ejected ink specified by the drive signal Com is ejected from the ejection unit D, a state in which the amount of ejected ink that is larger than the amount of ejected ink specified by the drive signal Com is ejected from the ejection unit D, or a state in which the ink cannot be landed at a desired landing position on the recording paper P because the ink is ejected at a speed different from the ink ejection speed specified by the drive signal Com, and the like.

In the ejection state determination process, the ink jet printer 1 executes a series of processes of the first process, the second process, the third process, the fourth process, and the fifth process, which are shown below. In the first process, the controller 60 selects the determination target ejection unit D-H from the M ejection units D provided in each head unit HU. In the second process, the controller 60 causes the determination target ejection unit D-H to generate residual vibration by actuating the determination target ejection unit D-H. In the third process, the detection circuit 20 generates the residual vibration signal NSAS based on a detection signal Vout detected by the determination target ejection unit D-H. In the fourth process, the ejection state determination circuit 64 determines the ejection state for the determination target ejection unit D-H based on the residual vibration signal NSAS to generate determination information Stt indicating the result of the determination. In the fifth process, the controller 60 stores the determination information Stt in the storage unit 61.

As described above, the ink jet printer 1 according to the present embodiment executes a maintenance process for normally recovering the ink ejection state in the ejection unit D in which the ejection abnormality has occurred. Specifically, the maintenance process is a general term for processes for returning the ink ejection state of the ejection unit D to a normal state, such as a flushing process, a wiping process, and a pumping process. The flushing process is a process of discharging ink from the ejection unit D. The wiping process is a process of wiping foreign matter such as paper dust attaching to the vicinity of the nozzle N of the ejection unit D with a wiper. The pumping process is a process of sucking ink, air bubbles, and the like in the ejection unit D by a tube pump.

Further, the ink jet printer 1 according to the present embodiment may eject ink from the ejection unit D having a normal ejection state instead of the ejection unit D having an abnormal ejection state as a printing process to execute a complementary printing process for forming an image corresponding to the print data Img on the recording paper P.

More specifically, the complementary printing process is a printing process in which when an ejection abnormality occurs in one ejection unit D, instead of ejecting ink from the one ejection unit D, the amount of ink ejected from another ejection unit D different from the one ejection unit D is increased to complement the role of the one ejection unit D by the another ejection unit D. In the following, a printing process other than the complementary printing process, that is, a printing process in which any ejection unit D is executed without complementing another ejection unit D, may be referred to as a normal printing process.

1.2. Outline of Recording Head HD and Ejection Unit D

The recording head HD and the ejection unit D provided in the recording head HD will be described with reference to FIGS. 3 to 6.

Figure 3:
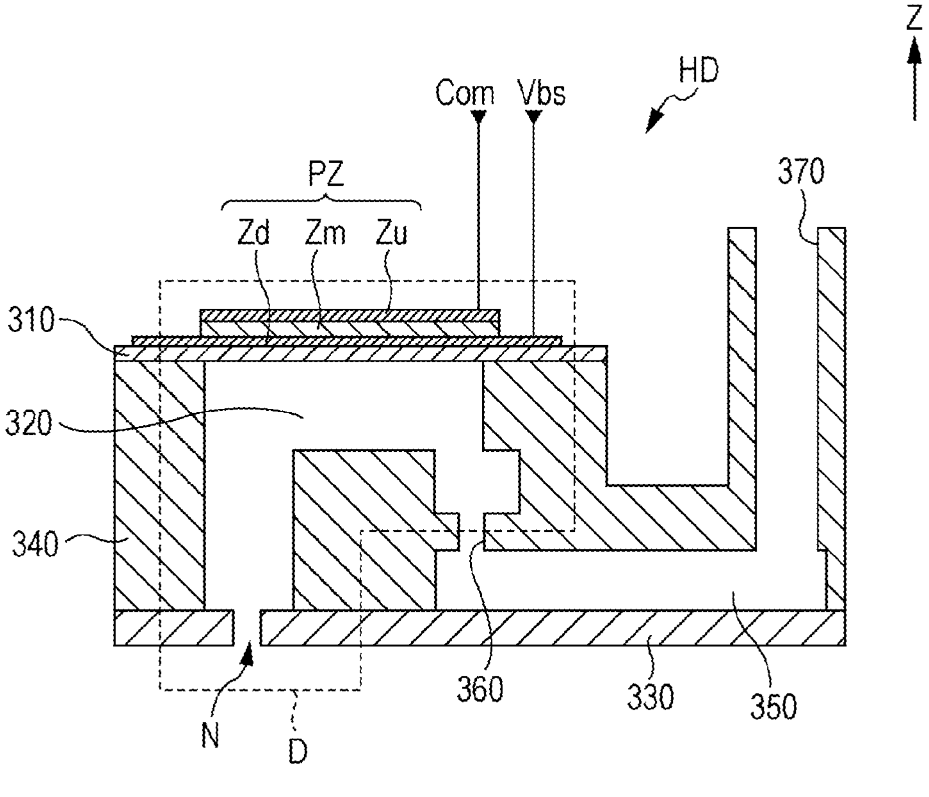
FIG. 3 is a schematic partial cross-sectional view of a recording head in which the recording head is cut so as to include an ejection unit.

FIG. 3 is a schematic partial cross-sectional view of the recording head HD in which the recording head HD is cut so as to include the ejection unit D. As shown in FIG. 3, the ejection unit D includes a piezoelectric element PZ, a cavity 320 filled with ink, a nozzle N communicating with the cavity 320, and a vibration plate 310. The cavity 320 is an example of a "pressure chamber". The ejection unit D ejects the ink in the cavity 320 from the nozzle N by supplying the drive signal Com to the piezoelectric element PZ and actuating the piezoelectric element PZ by the drive signal Com. The cavity 320 is a space partitioned by a cavity plate 340, a nozzle plate 330 in which the nozzle N is formed, and the vibration plate 310. The cavity 320 communicates with a reservoir 350 via an ink supply port 360. The reservoir 350 communicates with the liquid container 14 corresponding to the ejection unit D via an ink intake port 370.

In the embodiment, a unimorph type as shown in FIG. 3 is employed as the piezoelectric element PZ. The piezoelectric element PZ is not limited to the unimorph type, and a bimorph type, a laminated type, or the like may be employed.

The piezoelectric element PZ includes an upper electrode Zu, a lower electrode Zd, and a piezoelectric body Zm provided between the upper electrode Zu and the lower electrode Zd. Then, when the lower electrode Zd is set to the constant potential Vbs and the drive signal Com is supplied to the upper electrode Zu, whereby a voltage is applied between the upper electrode Zu and the lower electrode Zd, the piezoelectric element PZ is displaced in the +Z direction or the −Z direction according to the applied voltage, and as a result of this displacement, the piezoelectric element PZ vibrates. The lower electrode Zd is an example of "one end of the piezoelectric element".

The vibration plate 310 is installed in the opening of the upper face of the cavity plate 340. The lower electrode Zd is joined to the vibration plate 310. Therefore, when the piezoelectric element PZ is actuated by the drive signal Com and vibrates, the vibration plate 310 also vibrates. Then, the volume of the cavity 320 changes due to the vibration of the vibration plate 310, and the ink with which the cavity 320 is filled is ejected from the nozzle N. When the ink in the cavity 320 is reduced due to the ejection of the ink, the ink is supplied from the reservoir 350.

Figure 4:
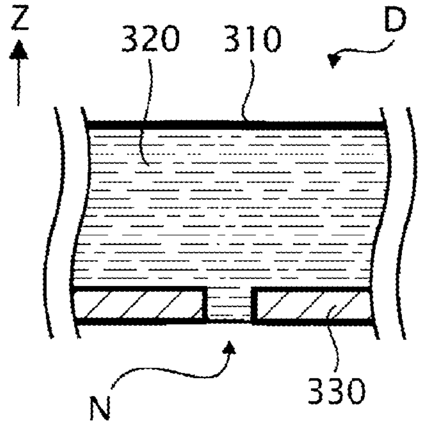
FIG. 4 is an explanatory diagram for explaining an example of an ink ejection operation of the ejection unit.
Figure 5:
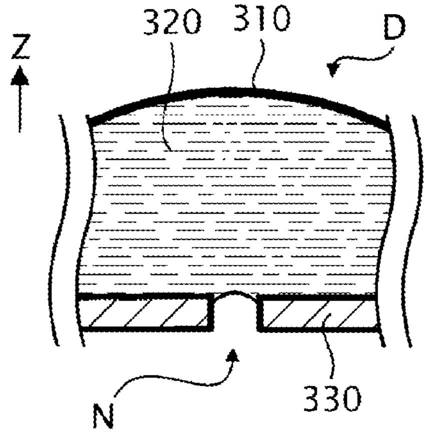
FIG. 5 is an explanatory diagram for explaining an example of an ink ejection operation of the ejection unit.
Figure 6:
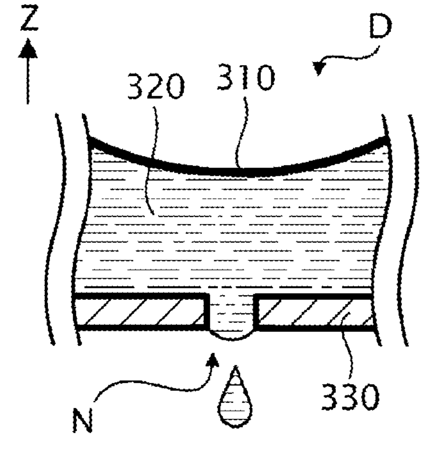
FIG. 6 is an explanatory diagram for explaining an example of an ink ejection operation of the ejection unit.

FIGS. 4 to 6 are explanatory diagrams for explaining an example of the ink ejection operation of the ejection unit D. As illustrated in FIG. 4, by changing the potential of the drive signal Com supplied to the piezoelectric element PZ included in the ejection unit D, the controller 60 causes the piezoelectric element PZ to generate a distortion in which the piezoelectric element PZ is displaced in the +Z direction to bend the vibration plate 310 of the ejection unit D in the +Z direction. As a result, as in the state illustrated in FIG. 5, the volume of the cavity 320 of the ejection unit D is expanded as compared with the volume of the state illustrated in FIG. 4.

Next, by changing the potential indicated by the drive signal Com, the controller 60 causes the piezoelectric element PZ to generate a distortion in which the piezoelectric element PZ is displaced in the −Z direction to bend the vibration plate 310 of the ejection unit D in the −Z direction. As a result, as illustrated in FIG. 6, the volume of the cavity 320 rapidly contracts, and part of the ink with which the cavity 320 is filled is ejected, as an ink droplet, from the nozzle N communicating with the cavity 320. After the piezoelectric element PZ and the vibration plate 310 are actuated by the drive signal Com and displaced in the Z axis direction, residual vibration occurs in the ejection unit D including the vibration plate 310.

1.3. FFC 19

FIG. 7 is a diagram showing the wiring arrangement of the FFC 19. The FFC 19 has two shield layers 193 and 194, a plurality of wires 191 and an insulating layer 192. The two shield layers 193 and 194 are formed containing a conductive material such as aluminum or gold. The plurality of wires 191 is provided between the shield layers 193 and 194, is formed containing a conductive material, and transmits various signals. The insulating layer 192 is made of an insulating material provided between the shield layers 193 and 194 so as to cover the plurality of wires 191.

In the example of FIG. 7, among the plurality of wires 191, a wire 191-SI for transmitting the designation signal SI, wires 191 for transmitting the signal related to the head unit HU[q1], and wires 191 for transmitting the signal related to the head unit HU[q2] are displayed. The signal associated with the head unit HU[q] means a signal supplied to the head unit HU[q] and a signal acquired from the head unit HU[q]. The variable q1 can take an odd number from 1 to Q−1. The variable q2 is an integer obtained by adding one to the variable q1. Since the variable q1 is odd, the variable q2 can take an even number from 2 to Q.

The wires 191 that transmits the signal related to the head unit HU[q1] include a wire 191-N[q1] that transmits a residual vibration signal NSAS[q1], a wire 191-V1[*q*1] that transmits a constant voltage signal SVbs1[*q*1], a wire 191-CA[q1] that transmits a drive signal ComA[q1], a wire 191-ComB[q1] that transmits a drive signal ComB[q1], and a wire 191-V2[*q*1] that transmits a constant voltage signal SVbs2[*q*1]. The constant voltage signals SVbs1[*q*] and SVbs2[*q*] are supplied to a lower electrode Zd[q][m].

The wires 191 that transmit the signal related to the head unit HU[q2] include a wire 191-N[q2] that transmits a residual vibration signal NSAS[q2], a wire 191-V1[*q*2] that transmits a constant voltage signal SVbs1[*q*2], a wire 191-CA[q2] that transmits a drive signal ComA[q2], a wire 191-CB[q2] that transmits a drive signal ComB[q2], and a wire 191-V2[*q*2] that transmits a constant voltage signal SVbs2[*q*2]. The wire 191-CA[q] is an example of "first wiring". The wire 191-CB[q] is an example of "second wiring". The wire 191-V1[*q*] is an example of "third wiring". The wire 191-V2[*q*] is an example of "fourth wiring". The wire 191-SI is an example of "control wiring". The wire 191-N[q] is an example of "detection wiring".

As illustrated in FIG. 7, the wire 191-CA[q1] and the wire 191-CB[q1] are disposed between the wire 191-V1[*q*1] and the wire 191-V2[*q*1]. Further, in the example of FIG. 7, the wire 191-SI and the wire 191-N[q1] are disposed opposite the wire 191-V2[*q*] with respect to the wire 191-V1[*q*1], and the wire 191-N[q2] is disposed opposite the wire 191-CB [q1] with respect to the wire 191-V2[*q*1]. The plurality of wires 191 illustrated in FIG. 7 is disposed in the following order when described using the signal names transmitted by the wires 191: SI- . . . -NSAS[q1]-SVbs1[*q*1]-ComA[q1]-ComB[q1]-SVbs2[*q*1]-NSAS[q2]-SVbs1[*q*2]-ComA[q2]-ComB[q2]-SVbs2[*q*2].

1.4. Head Unit HU Configuration

Hereinafter, the configuration of each head unit HU will be described with reference to FIG. 8.

Figure 8:
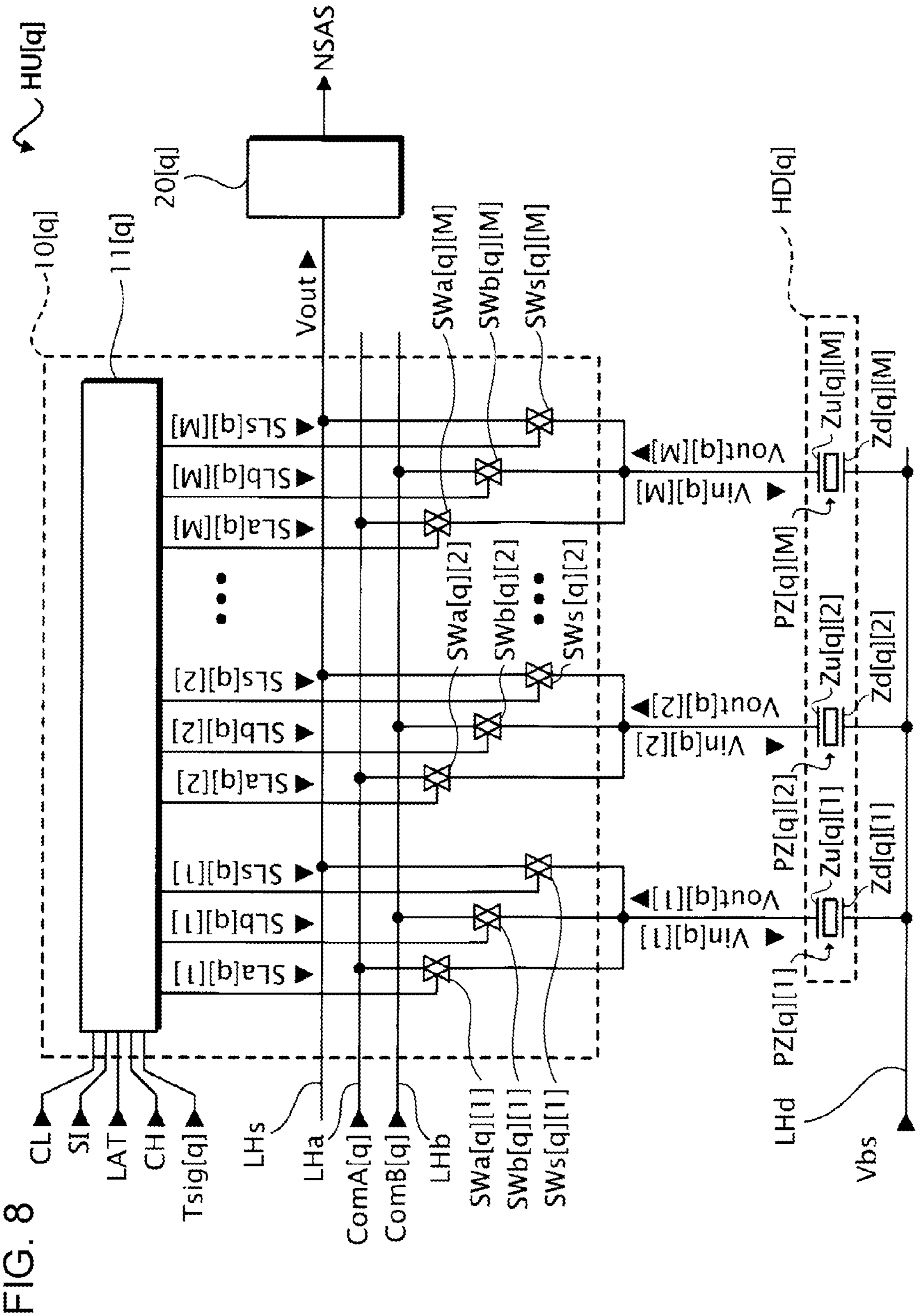
FIG. 8 is a block diagram showing an example of a configuration of a head unit.

FIG. 8 is a block diagram showing an example of the configuration of the head unit HU[q]. As described above, the head unit HU[q] includes a recording head HD[q], the switching circuit 10[*q*], and the detection circuit 20[*q*]. Further, the head unit HU[q] includes an internal wire LHa to which the drive signal ComA[q] is supplied from the drive signal generation circuit 62[*q*], an internal wire LHb to which the drive signal ComB[q] is supplied from the drive signal generation circuit 62[*q*], and an internal wire LHs for supplying the detection signal Vout detected from the ejection unit D to the detection circuit 20[*q*].

As shown in FIG. 8, the switching circuit 10[*q*] includes M switches SWa[q][1] to SWa[q][M], M switches SWb[q] [1] to SWb[q][M], M switches SWs[q][1] to SWb[q][M], and a coupling state designation circuit 11 for designating the coupling state of each switch. As each switch, for example, a transmission gate can be employed. The coupling state designation circuit 11 generates, based on at least some of the designation signal SI, a latch signal LAT, a change signal CH, and a period designation signal Tsig[q] supplied from the controller 60, a coupling state designation signal SLa[q][m] that designates the on/off of a switch SWa[q][m], a coupling state designation signal SLb[q][m] that designates the on/off of a switch SWb[q][m], and a coupling state designation signal SLs[q][m] that designates the on/off of a switch SWs [m] for each of the variables m that can be taken from 1 to M.

The switch SWa[q][m] switches whether to electrically couple the internal wire LHa and an upper electrode Zu[q] [m] of a piezoelectric element PZ[q][m] provided in the ejection unit D[q][m] according to the coupling state designation signal SLa[q][m]. For example, the switch SWa[q] [m] is turned on when the coupling state designation signal SLa[q][m] is at the high level and is turned off when the coupling state designation signal SLa[q][m] is at the low level. The switch SWb[q][m] switches whether to electrically couple the internal wire LHb and the upper electrode Zu[q][m] of the piezoelectric element PZ[q][m] provided in the ejection unit D[q][m] according to the coupling state designation signal SLb[q][m]. For example, the switch SWb [q][m] is turned on when the coupling state designation signal SLb[q][m] is at the high level and is turned off when the coupling state designation signal SLb[q][m] is at the low level. Of the drive signals ComA[q] and ComB[q], the signal actually supplied to the piezoelectric element PZ[q] [m] of the ejection unit D[q][m] through the switch SWa[q] [m] or SWb[q][m] may be referred to as a supply drive signal Vin[q][m].

The switch SW [q][m] switches whether to electrically couple the internal wire LHs and the upper electrode Zu[q] [m] of the piezoelectric element PZ[q][m] provided in the ejection unit D[q][m] according to the coupling state designation signal SLs[q][m]. For example, the switch SWs[q] [m] is turned on when the coupling state designation signal SLs[q][m] is at the high level and is turned off when the coupling state designation signal SLs[q][m] is at the low level.

The detection signal Vout[q][m] output from the piezoelectric element PZ[q][m] of the ejection unit D[q][m] actuated as the determination target ejection unit D[q]-H is supplied to the detection circuit 20[*q*] via the internal wire LHs. Then, the detection circuit 20[*q*] generates the residual vibration signal NSAS based on the detection signal Vout [q][m].

1.5. Operation of Head Unit HU

Hereinafter, the operation of each head unit HU will be described with reference to FIGS. 9 to 14.

In the present embodiment, the operating period of the ink jet printer 1 includes one or a plurality of unit periods Tu. It is assumed that the ink jet printer 1 according to the present embodiment executes one of actuation of each ejection unit D in the printing process, and actuation of the determination target ejection unit D-H and detection of residual vibration in the ejection state determination process in each unit period Tu. However, the embodiment is not limited to such an embodiment, and the ink jet printer 1 may execute both actuation of each ejection unit D in the printing process, and actuation of the determination target ejection unit D-H and detection of residual vibration in the ejection state determination process in each unit period Tu. In general, the ink jet printer 1 repeatedly executes a printing process over a plurality of continuous or intermittent unit periods Tu to eject ink from each ejection unit D one or a plurality of times to form the image indicated by print data Img. Further, in the ink jet printer 1 according to the present embodiment executes the ejection state determination processes M times in M unit periods Tu provided continuously or intermittently to execute the ejection state determination process with each of the M ejection units D[q][1] to D[q][M] set as the determination target ejection unit D-H.

Figure 9:
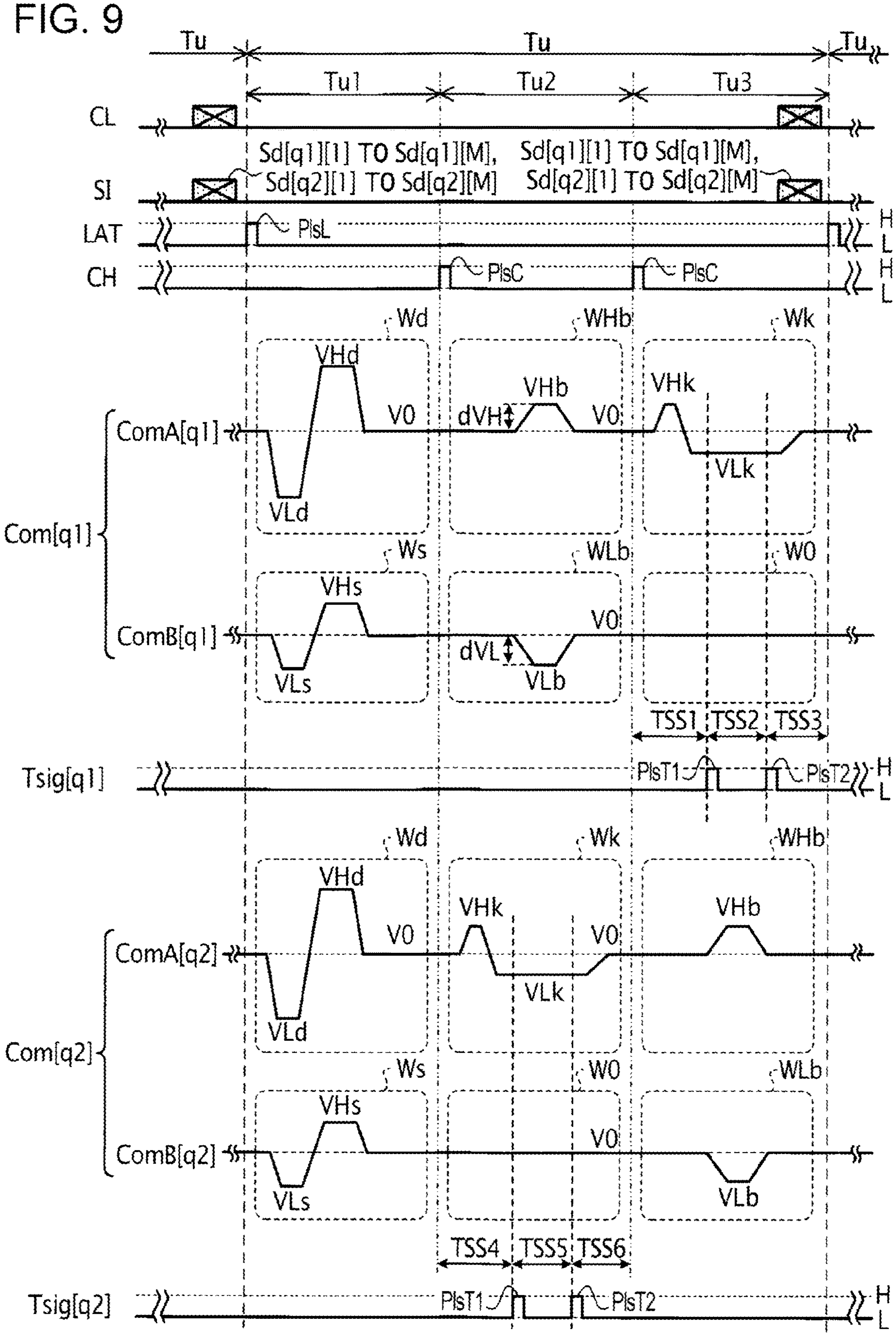
FIG. 9 is a diagram showing a timing chart for explaining the operation of the ink jet printer in a unit period Tu.

FIG. 9 is a timing chart for explaining the operation of the ink jet printer 1 in the unit period Tu. In FIG. 9, the drive signal ComA[q1] supplied to the head unit HU[q1], the drive signal ComB[q1], the period designation signal Tsig[q1], and the drive signal ComA[q2] supplied to the head unit HU[q2], the drive signal ComB[q2], and the period designation signal Tsig[q2] will be illustrated.

As shown in FIG. 9, the controller 60 outputs a latch signal LAT having a pulse PlsL and a change signal CH having a pulse PlsC. As a result, the controller 60 defines the unit period Tu as the period from the rise of the pulse PlsL to the rise of the next pulse PlsL. Further, the controller 60 divides the unit period Tu into three control periods Tu1, Tu2, and Tu3 by the pulse PlsC.

The designation signal SI includes individual designation signals Sd[q1][1] to Sd[q1][M] that designate the actuation mode of the ejection units D[q1][1] to D[q1][M] in each unit period Tu, and individual designation signals Sd[q2][1] to Sd[q2][M] that designate the actuation mode of the ejection units D[q2][1] to D[q2][M] in each unit period Tu. Then, when at least one of the printing process and the ejection state determination process is executed in the unit period Tu, the controller 60 supplies the designation signal SI including the individual designation signals Sd[q1][1] to Sd[q1][M] to the coupling state designation circuit 11[*q*1] in synchronization with a clock signal CL prior to the start of the unit period Tu as shown in FIG. 9. In this case, the coupling state designation circuit 11[*q*1] generates the coupling state designation signals SLa[q1][*m*], SLb[q1][*m*], and SLs[q1][*m*] based on the individual designation signal Sd[q1][*m*] in the unit period Tu. Similarly, when at least one of the printing process and the ejection state determination process is executed in the unit period Tu, the controller 60 supplies the designation signal SI including the individual designation signals Sd[q2][1] to Sd[q2][M] to the coupling state designation circuit 11[*q*2] in synchronization with a clock signal CL prior to the start of the unit period Tu as shown in FIG. 9. In this case, the coupling state designation circuit 11[*q*2] generates the coupling state designation signals SLa[q2][*m*], SLb[q2][*m*], and SLs[q2][*m*] based on the individual designation signal Sd[q2][*m*] in the unit period Tu.

The individual designation signal Sd[q][m] according to the present embodiment a signal that designates one of the four actuation modes: ejection of ink in an amount corresponding to a large dot, ejection of ink in an amount corresponding to a small dot, ejection of no ink, and actuation as a determination target in the ejection state determination process for the ejection unit D [m] in each unit period Tu. Hereinafter, the amount corresponding to the large dot may be referred to as a "large amount". Then, ejection of a large amount of ink may be referred to as "formation of the large dot". Further, the amount corresponding to the small dot may be referred to as "a small amount". Further, ejection of a small amount of ink may be referred to as "formation of the small dot". Further, the actuation as the determination target in the ejection state determination process may be referred to as "actuation as the determination target ejection unit D-H" or "actuation as the determination target ejection unit D[q]-H".

First, the drive signal Com[q1] will be described. As shown in FIG. 9, the drive signal generation circuit 62[*q*1] outputs the drive signal ComA[q1] having a large dot waveform Wd provided in the control period Tu1, a first micro-vibration waveform WHb the control period Tu2, and a determination waveform Wk provided in the control period Tu3. Further, the drive signal generation circuit 62[*q*1] outputs the drive signal ComB[q1] having a small dot waveform Ws provided in the control period Tu1, a second micro-vibration waveform WLb provided in the control period Tu2, and a waveform WO provided in the control period Tu3. The large dot waveform Wd, the first micro-vibration waveform WHb, the determination waveform Wk, the small dot waveform Ws, the second micro-vibration waveform WLb, and the waveform WO have a potential set to a reference potential V0 at the start and end. In the present embodiment, as an example, it is assumed that the individual designation signal Sd[q][m] is a 3-bit digital signal.

The large dot waveform Wd and the small dot waveform Ws will be described. The large dot waveform Wd is a waveform for forming large dot. The small dot waveform Ws is a waveform for forming the small dot. In the present embodiment, the designer of the ink jet printer 1 defines the large dot waveform Wd and the small dot waveform Ws so that the potential difference between the highest potential VHd and the lowest potential VLd of the large dot waveform Wd is larger than the potential difference between the highest potential VHs and the lowest potential VLs of the small dot waveform Ws. Specifically, the large dot waveform Wd is defined so that when the ejection unit D[q1][*m*] is actuated by the drive signal ComA[q1] having the large dot waveform Wd, the amount of ink corresponding to the large dot is ejected from the ejection unit D[q1][*m*]. Further, the small dot waveform Ws is defined so that when the ejection unit D[q1][*m*] is actuated by the drive signal ComB [q1] having the small dot waveform Ws, a small amount of ink is ejected from the ejection unit D[q1][*m*].

When the individual designation signal Sd[q1][*m*] designates the formation of a large dot for the ejection unit D[q1][*m*], the coupling state designation circuit 11[*q*1] sets the coupling state designation signal SLa[q1][*m*] to the high level during the control period Tu1, and to the low level during the control periods Tut and Tu3, and sets the coupling state designation signals SLb[q1][*m*] and SLs[q1][*m*] to the low level during the unit period Tu. In this case, the ejection unit D[q1][*m*] is actuated by the drive signal ComA[q1] of the large dot waveform Wd during the control period Tu1 to eject an amount of ink corresponding to the large dot. As a result, the ejection unit D[q1][*m*] ejects a large amount of ink, and the large dot is formed on the recording paper P.

When the individual designation signal Sd[q1][*m*] designates the formation of a small dot for the ejection unit D[q1][*m*], the coupling state designation circuit 11[*q*1] sets the coupling state designation signals SLa[q1][*m*] and SLs [q1][*m*] to the low level during the unit period Tu, and sets the coupling state designation signal SLb[q1][*m*] to the high level during the control period Tu1, and to the low level during the control periods Tu2 and Tu3. In this case, the ejection unit D[q1][*m*] is actuated by the drive signal ComB [q1] of the small dot waveform Ws during the control period Tu1 to eject an amount of ink corresponding to the small dot. As a result, the ejection unit D[q1][*m*] ejects a small amount of ink, and the small dot is formed on the recording paper P.

The first micro-vibration waveform WHb and the second micro-vibration waveform WLb will be described. The first micro-vibration waveform WHb and the second micro-vibration waveform WLb are waveforms that drive the piezoelectric element PZ so that ink is not ejected from the ejection unit D[q1][*m*]. Hereinafter, the first micro-vibration waveform WHb and the second micro-vibration waveform WLb are collectively referred to as a "micro-vibration waveform". When the micro-vibration waveform is supplied to the upper electrode Zu of the piezoelectric element PZ, the ink near the nozzle N vibrates slightly, and an increase in the viscosity of the ink can be suppressed. Even when the first micro-vibration waveform WHb or the second micro-vibration waveform WLb is supplied to the upper electrode Zu of the piezoelectric element PZ, ink is not ejected from the nozzle N corresponding to the piezoelectric element PZ. As shown in FIG. 9, the absolute value of a potential difference dVH obtained by subtracting the reference potential V0 from a highest potential VHb of the first micro-vibration waveform WHb is substantially identical to the absolute value of a potential difference dVL obtained by subtracting the reference potential V0 from a lowest potential VLb of the second micro-vibration waveform WLb. This "substantially identical" includes not only the case where they are completely identical, but also the case where they can be regarded as "identical" when at least one error among manufacturing errors and errors due to noise is taken into consideration.

When the individual designation signal Sd[q1][*m*] designates ejection of no ink for the ejection unit D[q1][*m*], the coupling state designation circuit 11[*q*1] selects any one of the first setting mode and the second setting mode shown below, and vibrates the ink in the vicinity of the nozzle N slightly. In the first setting mode, the coupling state designation circuit 11[*q*1] sets the coupling state designation signal SLa[q1][*m*] to the high level during the control period Tu2 and to the low level during the control periods Tu1 and Tu3, and sets the coupling state designation signals SLb[q1][*m*] and SLs[q1][*m*] to the low level during the unit period Tu. As a result, the ejection unit D[q1][*m*] is actuated by the drive signal ComB[q1] of the first micro-vibration waveform WHb during the control period Tu2 to slightly vibrate the ink near the nozzle N. In the second setting mode, the coupling state designation circuit 11[*q*1] sets the coupling state designation signal SLb[q1][*m*] to the high level during the control period Tu2 and to the low level during the control periods Tu1 and Tu3, and sets the coupling state designation signals SLa[q1][*m*] and SLs[q1][*m*] to the low level during the unit period Tu. As a result, the ejection unit D[q1][*m*] is actuated by the drive signal ComB[q1] of the second micro-vibration waveform WLb during the control period Tu2 to slightly vibrate the ink near the nozzle N.

For which of the first setting mode or the second setting mode is selected, the coupling state designation circuit 11[*q*1] sets the coupling state designation signals SLa[q1][*m*], SLb[q1][*m*] and SLs[q1] so that, for example, the number of ejection units D for which the first setting mode is selected and the number of ejection units D for which the second setting mode is selected approach the same number based on the individual designation signal Sd[q1][*m*]. Specifically, it is assumed that ejection of no ink is designated for all of the ejection unit D[q1][1] to the ejection unit D[q1][M] in a certain unit period Tu. The coupling state designation circuit 11[*q*1] sets the coupling state designation signals SLa[q1][*m*], SLb[q1][*m*] and SLs[q1][*m*] according to the first setting mode for the ejection unit D[q1][*m*] whose variable m is odd, and sets the coupling state designation signals SLa[q1][*m*], SLb[q1][*m*] and SLs[q1][*m*] according to the second setting mode for the ejection unit D[q1][*m*] in which the variable m is an even number.

The determination waveform Wk will be described. The determination waveform Wk is a waveform that actuates the piezoelectric element PZ as a determination target in the ejection state determination process. When the designer of the ink jet printer 1 supplies the drive signal ComB[q1] having the determination waveform Wk to the ejection unit D[q1][*m*], defines the waveform of the determination waveform Wk so that the ejection unit D[q1][*m*] is actuated to the extent that no ink is ejected from the ejection unit D[q1][*m*]. Specifically, the designer of the ink jet printer 1 defines the determination waveform Wk so that the potential difference between the highest potential VHk and the lowest potential VLk of the determination waveform Wk is smaller than the potential difference between the highest potential VHs and the lowest potential VLs of the small dot waveform Ws. Further, the controller 60 outputs the period designation signal Tsig[q1] having a pulse PlsT1 and a pulse PlsT2 in the control period Tu3. As a result, the controller 60 divides the control period Tu3 into a control period TSS1 from the start of the pulse PlsC to the start of the pulse PlsT1, a control period TSS2 from the start of the pulse PlsT1 to the start of the pulse PlsT2, and a control period TSS3 from the start of the pulse PlsT2 to the start of the pulse PlsL.

When the individual designation signal Sd[q1][*m*] designates the ejection unit D[q1][*m*] as the determination target ejection unit D-h, the coupling state designation circuit 11[*q*1] sets the coupling state designation signal Sla[q1][*m*] to the low level during the control periods Tu1, Tut, and the control period TSS2, and to the high level during the control periods TSS1 and TSS3, and sets the coupling state designation signal SLb[q1][*m*] to the low level during the unit period Tu, and sets the coupling state designation signal SLs[q1][*m*] to the low level during the control periods TSS1 and TSS3 and the high level during the control period TSS2. In this case, the determination target ejection unit D[q1]-H is actuated by the drive signal ComA[q1] of the determination waveform Wk during the control period TSS1. Specifically, the piezoelectric element PZ included in the determination target ejection unit D[q1]-H is displaced by the drive signal ComA[q1] of the determination waveform Wk during the control period TSS1. As a result, vibration is generated in the determination target ejection unit D-H, and this vibration remains even during the control period TSS2. Then, in the control period TSS2, the upper electrode Zu of the piezoelectric element PZ of the determination target ejection unit D[q1]-H changes the potential according to the residual vibration generated in the determination target ejection unit D[q1]-H. In other words, in the control period TSS2, the upper electrode Zu of the piezoelectric element PZ of the determination target ejection unit D[q1]-H indicates the potential according to the electromotive force of the piezoelectric element PZ due to the residual vibration generated in the determination target ejection unit D[q1]-H. Then, the potential of the upper electrode Zu can be detected as the detection signal Vout in the control period TSS2.

The potential of the waveform WO does not fluctuate from the reference potential V0 from the start to the end. By providing the waveform WO at the same timing as the determination waveform Wk, it is possible to suppress the generation of noise due to the drive signal ComB[q1] in the detection signal Vout detected in the control period TSS2.

Next, the drive signal Com[q2] will be described. As shown in FIG. 9, the drive signal generation circuit 62[*q*2] outputs the drive signal ComA[q2] having the large dot waveform Wd provided in the control period Tu1, the determination waveform Wk provided in the control period Tu2, and the first micro-vibration waveform WHb provided in the control period Tu3. Further, the drive signal generation circuit 62[*q*2] outputs the drive signal ComB[q2] having the small dot waveform Ws provided in the control period Tu1, the waveform WO provided in the control period Tu2, and the second micro-vibration waveform WLb provided in the control period Tu3.

When the individual designation signal Sd[q2][*m*] designates the formation of a large dot for the ejection unit D[q2][*m*], the coupling state designation circuit 11[*q*2] sets the coupling state designation signal SLa[q2][*m*] to the high level during the control period Tu1, and to the low level during the control periods Tu2 and Tu3, and sets the coupling state designation signals SLb[q2][*m*] and SLs[q2][*m*] to the low level during the unit period Tu. In this case, the ejection unit D[q2][*m*] is actuated by the drive signal ComA[q2] of the large dot waveform Wd during the control period Tu1 to eject an amount of ink corresponding to the large dot. As a result, the ejection unit D[q2][*m*] ejects a large amount of ink, and the large dot is formed on the recording paper P.

When the individual designation signal Sd[q2][*m*] designates the formation of a small dot for the ejection unit D[q2][m], the coupling state designation circuit 11[q2] sets the coupling state designation signals SLa[q2][m] and SLs [q2][m] to the low level during the unit period Tu, and sets the coupling state designation signal SLb[q2][m] to the high level during the control period Tu1, and to the low level during the control periods Tu2 and Tu3. In this case, the ejection unit D[q2][m] is actuated by the drive signal ComB [q2] of the small dot waveform Ws during the control period Tu1 to eject an amount of ink corresponding to the small dot. As a result, the ejection unit D[q2][m] ejects a small amount of ink, and the small dot is formed on the recording paper P.

When the individual designation signal Sd[q2][m] designates ejection of no ink for the ejection unit D[q2][m], the coupling state designation circuit 11[q2] selects any one of the third setting mode and the fourth setting mode shown below, and vibrates the ink in the vicinity of the nozzle N slightly. In the third setting mode, the coupling state designation circuit 11[q2] sets the coupling state designation signal SLa[q2][m] to the high level during the control period Tu3 and to the low level during the control periods Tu1 and Tu2, and sets the coupling state designation signals SLb[q2] [m] and SLs[q2][m] to the low level during the unit period Tu. As a result, the ejection unit D[q2][m] is actuated by the drive signal ComA[q2] of the first micro-vibration waveform WHb during the control period Tu3 to slightly vibrate the ink near the nozzle N. In the fourth setting mode, the coupling state designation circuit 11[q2] sets the coupling state designation signal SLb[q2][m] to the high level during the control period Tu3 and to the low level during the control periods Tu1 and Tu3, and sets the coupling state designation signals SLa[q2][m] and SLs[q2][m] to the low level during the unit period Tu. As a result, the ejection unit D[q2][m] is actuated by the drive signal ComB[q2] of the second micro-vibration waveform WLb during the control period Tu3 to slightly vibrate the ink near the nozzle N.

The controller 60 outputs the period designation signal Tsig[q2] having the pulse PlsT1 and the pulse PlsT2 in the control period Tu2. As a result, the controller 60 divides the control period Tu2 into a control period TSS4 from the start of the pulse PlsC to the start of the pulse PlsT1, a control period TSS5 from the start of the pulse PlsT1 to the start of the pulse PlsT2, and a control period TSS6 from the start of the pulse PlsT2 to the start of the next pulse PlsC. When the individual designation signal Sd[q2][m] designates the ejection unit D[q2][m] as the determination target ejection unit D-h, the coupling state designation circuit 11[q2] sets the coupling state designation signal Sla[q2][m] to the low level during the control periods Tu1, Tu3, and the control period TSS5, and to the high level during the control periods TSS4 and TSS6, and sets the coupling state designation signal SLb[q2][m] to the low level during the unit period Tu, and sets the coupling state designation signal SLs[q2][m] to the low level during the control periods TSS4 and TSS6 and the high level during the control period TSS5. In this case, the determination target ejection unit D[q2]-H is actuated by the drive signal ComA[q2] of the determination waveform Wk during the control period TSS4. Specifically, the piezoelectric element PZ included in the determination target ejection unit D[q2]-H is displaced by the drive signal ComA[q2] of the waveform WS during the control period TSS4. As a result, vibration is generated in the determination target ejection unit D[q2]-H, and this vibration remains even during the control period TSS5. Then, in the control period TSS5, the upper electrode Zu of the piezoelectric element PZ of the determination target ejection unit D[q2]-H changes the potential according to the residual vibration generated in the determination target ejection unit D[q2]-H. Then, the potential of the upper electrode Zu can be detected as the detection signal Vout in the control period TSS5.

The first micro-vibration waveform WHb and the second micro-vibration waveform WLb will be described in more detail with reference to FIG. 10.

Figure 10:
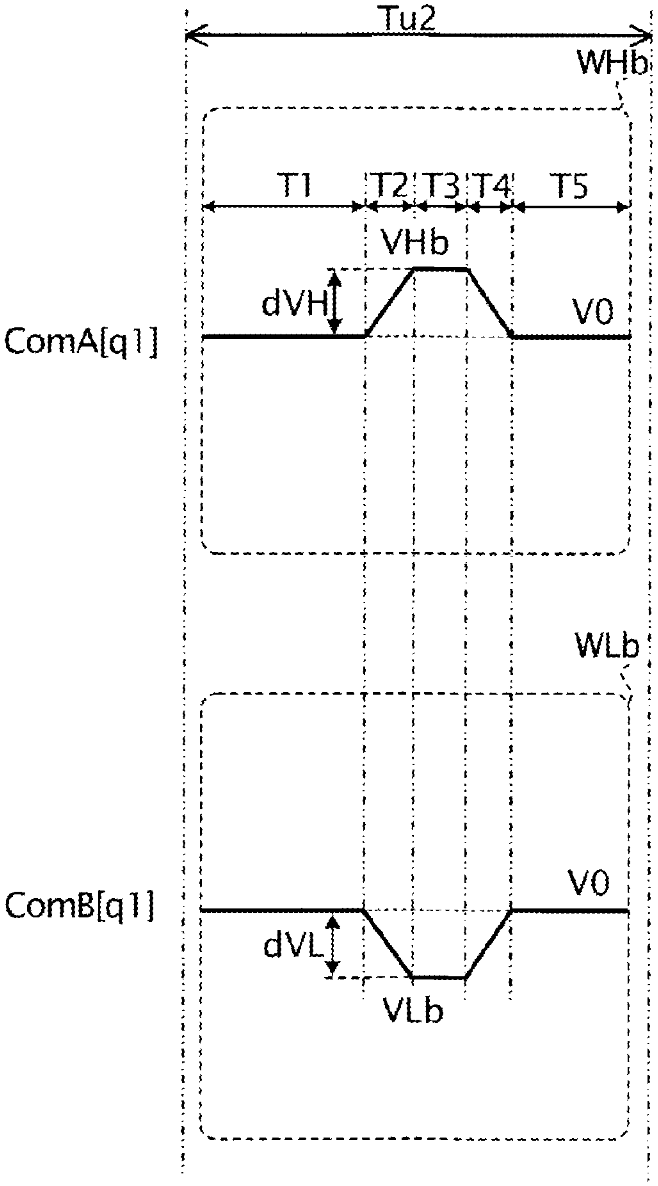
FIG. 10 is an explanatory diagram showing a first micro-vibration waveform WHb and a second micro-vibration waveform WLb.

FIG. 10 is an explanatory diagram showing the first micro-vibration waveform WHb and the second micro-vibration waveform WLb. In the example of FIG. 10, the first micro-vibration waveform WHb of the drive signal ComA[q1] in the control period Tu2 and the second micro-vibration waveform WLb of the drive signal ComB[q1] in the control period Tu2 are shown. The control period Tu2 is divided into a period T1, a period T2 following the period T1, a period T3 following the period T2, a period T4 following the period T3, and a period T5 following the period T4. During the period T1, the drive signal ComA[q1] is held at the reference potential V0. In the period T2, the drive signal ComA[q1] transitions from the reference potential V0 to the highest potential VHb. The highest potential VHb is higher than the reference potential V0. During the period T3, the drive signal ComA[q1] is held at the highest potential VHb. In the period T4, the drive signal ComA[q1] transitions from the highest potential VHb to the reference potential V0. During the period T5, the drive signal ComA [q1] is held at the reference potential V0. Similarly, during the period T1, the drive signal ComB[q1] is held at the reference potential V0. In the period T2, the drive signal ComB[q1] transitions from the reference potential V0 to the lowest potential VLb. The lowest potential VLb is lower than the reference potential V0. During the period T3, the drive signal ComB[q1] is held at the lowest potential VLb. In the period T4, the drive signal ComB[q1] transitions from the lowest potential VLb to the reference potential V0. During the period T5, the drive signal ComB[q1] is held at the reference potential V0. That is, in the present embodiment, the timing of the potential change in the first micro-vibration waveform WHb and the timing of the potential change in the second micro-vibration waveform WLb are substantially identical to each other. The drive signal ComA [q1] is an example of the "first drive signal". The drive signal ComB[q1] is an example of the "second drive signal". The piezoelectric element PZ[q1][m1] that actuates according to the supply of the drive signal ComA[q1] is an example of the "first piezoelectric element", and the piezoelectric element PZ[q1][m2] that actuates according to the supply of the drive signal ComB[q1] is an example of the "second piezoelectric element". The variable m1 is an integer from 1 to M. The variable m2 is an integer from 1 to M, and is an integer different from the variable m1. The ejection unit D[q1][m1] having the piezoelectric element PZ[q1][m1] is an example of the "first ejection unit", and the cavity 320 included in the ejection unit D[q1][m1] is an example of the "first pressure chamber", and the nozzle N included in the ejection unit D[q1][m1] is an example of the "first nozzle". A switch SWa[q1][m1] that switches whether to electrically couple the wire 191-CA[q1] and the ejection unit D[q1][m1] is an example of the "first switch". A switch SWb[q1][m2] that switches whether to electrically couple the wire 191-CB[q1] and the ejection unit D[q1][m2] is an example of the "second switch". The ejection unit D[q1][m2] having the piezoelectric element PZ[q1][m2] is an example of the "second ejection unit", and the cavity 320 included in the ejection unit D[q1][m2] is an example of the "second pressure chamber", and the nozzle N included in the ejection unit D[q1][m2] is an example of the "second nozzle". Further, the head unit HU[q1] is an example of the "first head unit", and the head unit HU[q2] is an example of the "second head unit". The drive signals ComA[q2] and ComB[q2] are an example of the "third drive signal", and the piezoelectric element PZ[q2][m] that is actuated according to the supply of the drive signal ComA[q2] or ComB[q2] is an example of the "third piezoelectric element". The detection circuit 20[q2] that detects Vibration generated in the piezoelectric element PZ[q2][m3] due to actuation of the piezoelectric element PZ[q2][m3] by the drive signal ComA[q2] or the drive signal ComB[q2], and outputs the result of the detection as the residual vibration signal NSAS[q2][m3] is an example of the "detection unit". The period T2 is an example of the "first period" and the "fourth period", the period T3 is an example of the "second period" and the "fifth period", and the period T4 is an example of the "third period" and the "sixth period". The reference potential V0 is an example of the "first potential" and the "third potential", the highest potential VHb is an example of the "second potential", and the lowest potential VLb is an example of the "fourth potential". The drive signal ComA[q2] is also an example of the "first drive signal". When the drive signal ComA[q2] is an example of the "first drive signal", the drive signal ComB[q2] is an example of the "second drive signal", the piezoelectric element PZ[q2][m3] that is actuated according to the supply of the drive signal ComA[q2] is an example of the "first piezoelectric element", and the piezoelectric element PZ[q2][m4] that is actuated according to the supply of the drive signal ComB[q2] is an example of the "second piezoelectric element". The variable m3 is an integer from 1 to M. The variable m4 is an integer from 1 to M, and is an integer different from the variable m3. Further, the ejection unit D[q2][m3] having the piezoelectric element PZ[q2][m3] is an example of the "first ejection unit", and the cavity 320 included in the ejection unit D[q2][m3] is an example of the "first pressure chamber", and the nozzle N included in the ejection unit D[q2][m3] is an example of the "first nozzle". A switch SWa[q2][m3] that switches whether to electrically couple the wire 191-CA[q2] and the ejection unit D[q2][m3] is an example of the "first switch". A switch SWb[q2][m4] that switches whether to electrically couple the wire 191-CB[q2] and the ejection unit D[q2][m4] is an example of the "second switch". The ejection unit D[q2][m4] having the piezoelectric element PZ[q2][m4] is an example of the "second ejection unit", and the cavity 320 included in the ejection unit D[q2][m4] is an example of the "second pressure chamber", and the nozzle N included in the ejection unit D[q2][m4] is an example of the "second nozzle". Further, the head unit HU[q2] is an example of the "first head unit", and the head unit HU[q1] is an example of the "second head unit". The drive signals ComA[q1] and ComB[q1] are an example of the "third drive signal", and the piezoelectric element PZ[q1][m] that actuates according to the supply of the drive signal ComA[q1] or ComB[q1] is an example of the "third piezoelectric element". The detection circuit 20[q1] that detects Vibration generated in the piezoelectric element PZ[q1][m1] due to actuation of the piezoelectric element PZ[q1][m1] by the drive signal ComA[q1] or the drive signal ComB[q1], and outputs the result of the detection as the residual vibration signal NSAS[q1][m1] is an example of the "detection unit".

Figure 11:
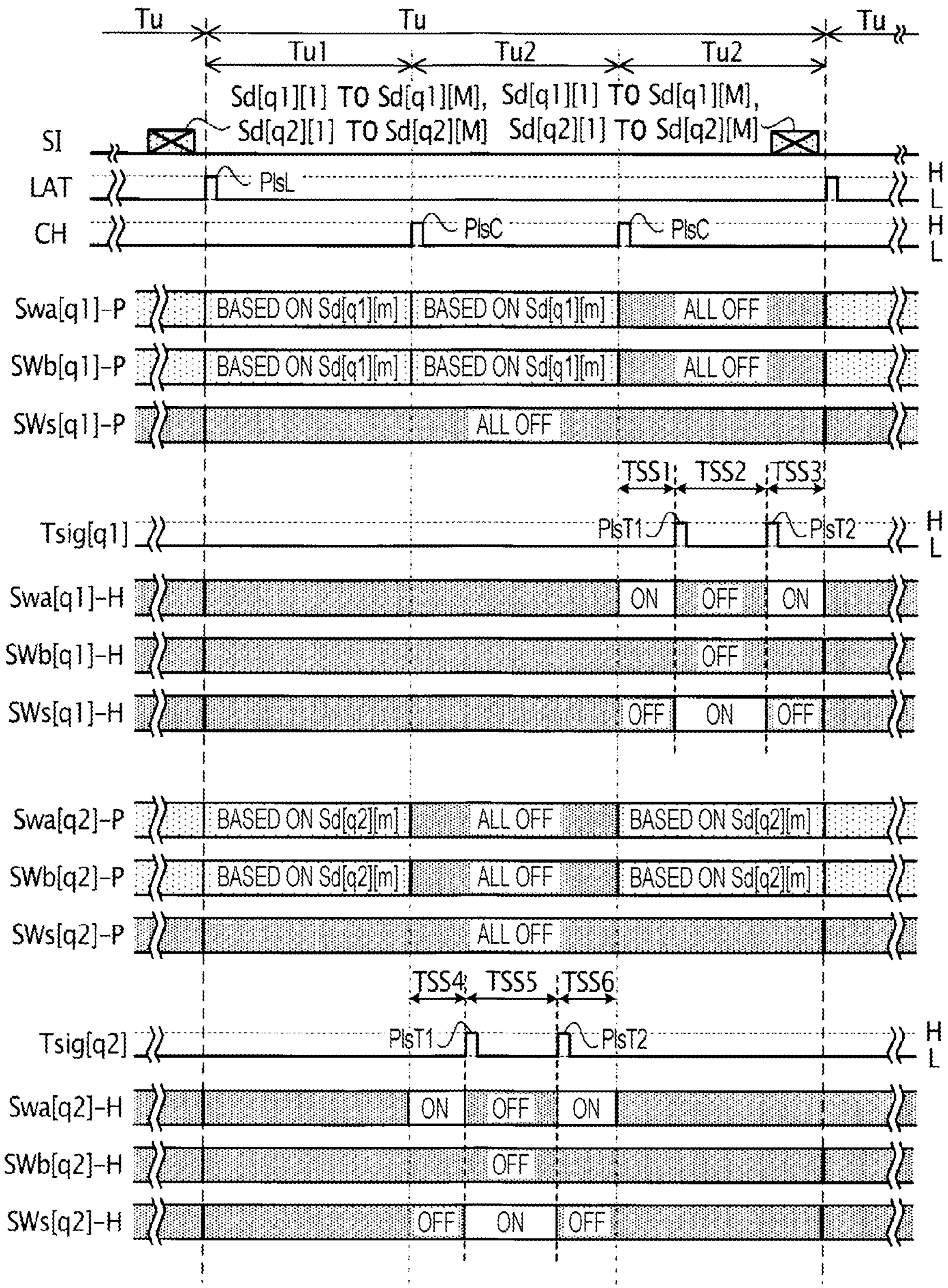
FIG. 11 is an explanatory diagram for explaining the operation of the switching circuit in the unit period Tu.

FIG. 11 is an explanatory diagram for explaining the operation of the switching circuit 10 in the unit period Tu. In the following, the switches SWa, SWb, and SWs provided corresponding to the determination target ejection unit D[q]-H may be referred to as the switches SWa[q]-H, SWb[q]-H, and SWs[q]-H, respectively. Further, in the following, the ejection unit D[q][m] actuated in the printing process may be referred to as a print drive ejection unit D[q]-P, and the switches SWa, SWb, and SWs provided corresponding to the print drive ejection unit D[q]-P may be referred to as switches SWa[q]-P, SWb[q]-P, and SWs[q]-P, respectively.

First, the head unit HU[q1] will be described. As shown in FIG. 11, when the ejection unit D[q1][m] operates as the print drive ejection unit D[q1]-P in the unit period Tu, the ejection unit D[q1][m] is actuated according to the individual designation signal Sd[q1][m] and will be used for printing process. As shown in FIG. 11, when the ejection unit D[q1][m] operates as the determination target ejection unit D[q1]-H during the unit period Tu, the switch SWa[q1][m], which is a switch SWa[q1]-H, is turned on during the control periods TSS1 and TSS3, the switch SWb[q1][m], which is a switch SWb[q1]-H, is turned off during the unit period of Tu, and the switch SWs[q1][m], which is a switch SWs[q1]-H, is turned on during the control period TSS2. In this case, the piezoelectric element PZ[q1][m] included in the ejection unit D[q1][m], which is the determination target ejection unit D[q1]-H, is actuated and displaced by the drive signal ComA[q1] during the control period TSS1, and a state in which residual vibration is generated in the ejection unit D[q1][m] during the control period TSS2 is created. Then, the detection signal Vout[q1][m] based on the residual vibration in the ejection unit D[q1][m] is supplied to the detection circuit 20[q1] via the internal wire LHs in the control period TSS2.

Next, the head unit HU[q2] will be described. As shown in FIG. 11, when the ejection unit D[q2][m] operates as the print drive ejection unit D[q2]-P in the unit period Tu, the ejection unit D[q2][m] is actuated according to the individual designation signal Sd[q2][m] and will be used for printing process. As shown in FIG. 11, when the ejection unit D[q2][m] operates as the determination target ejection unit D[q2]-H during the unit period Tu, the switch SWa[q2][m], which is a switch SWa[q2]-H, is turned on during the control periods TSS4 and TSS6, the switch SWb[q2][m], which is a switch SWb[q2]-H, is turned off during the unit period of Tu, and the switch SWs[q2][m], which is a switch SWs[q2]-H, is turned on during the control period TSS5. In this case, the piezoelectric element PZ[q2][m] included in the ejection unit D[q2][m], which is the determination target ejection unit D[q2]-H, is actuated and displaced by the drive signal ComA[q2] during the control period TSS4, and a state in which residual vibration is generated in the ejection unit D[q2][m] during the control period TSS5 is created. Then, the detection signal Vout[q2][m] based on the residual vibration in the ejection unit D[q2][m] is supplied to the detection circuit 20[q2] via the internal wire LHs in the control period TSS5.

Figure 12:
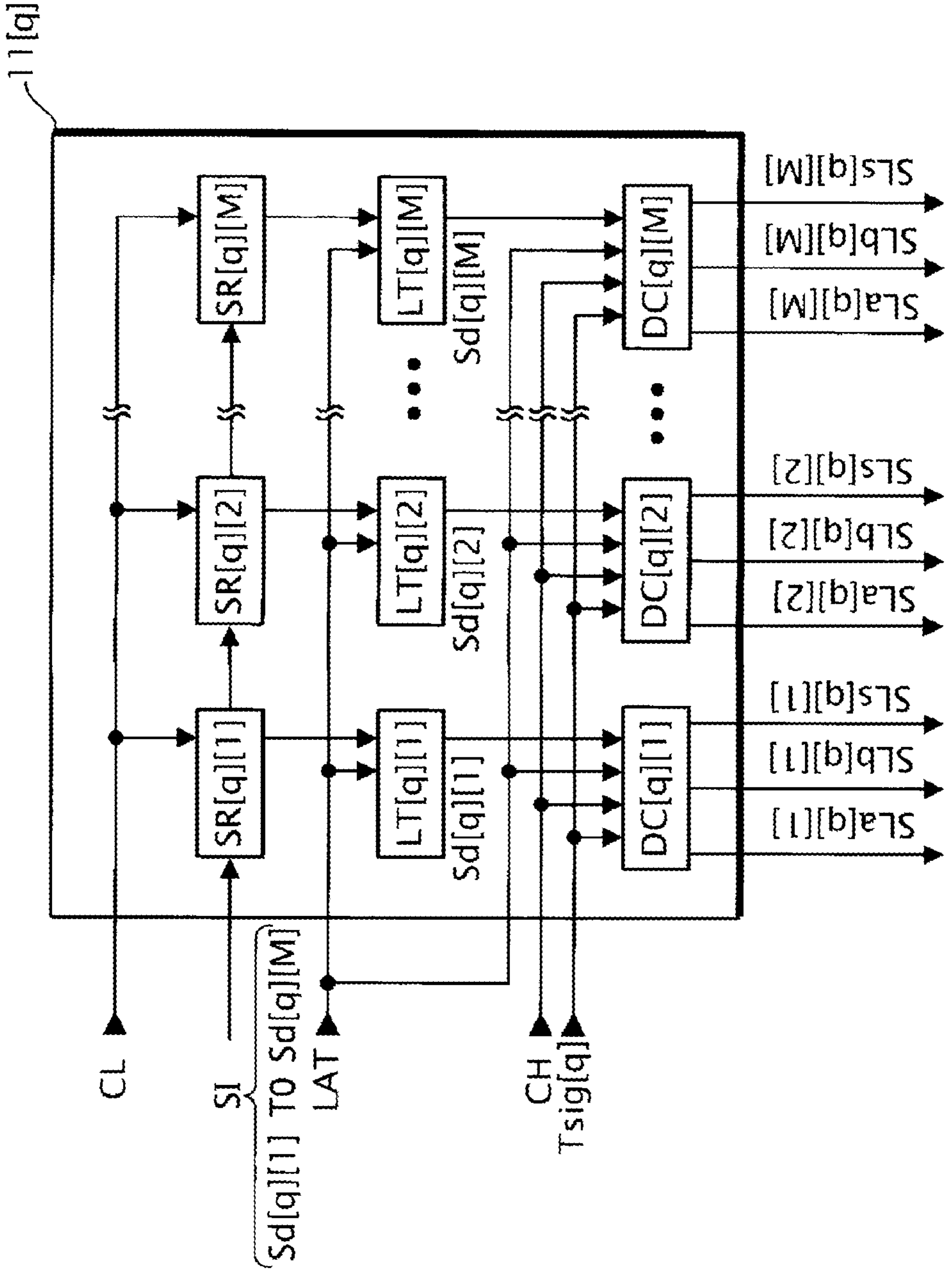
FIG. 12 is a diagram showing an example of the configuration of a coupling state designation circuit according to the present embodiment.

FIG. 12 is a diagram showing an example of the configuration of the coupling state designation circuit 11[q] according to the present embodiment. As shown in FIG. 10, the coupling state designation circuit 11[q] generates the coupling state designation signals SLa[q][1] to SLa[q][M], SLb[q][1] to SLb[q][M], and SLs[q][1] to SLs[q][M]. Specifically, the coupling state designation circuit 11 includes transfer circuits SR[q][1] to SR[q][M], latch circuits LT[q][1] to LT[q][M], and decoders DC[q][1] to DC[q][M] so as to have a one-to-one correspondence with the ejection units D[q][1] to D[q][M]. Of these, the individual designation signal Sd[q][m] is supplied to the transfer circuit SR[q][m]. FIG. 12 illustrates an example in which the individual designation signals Sd[q][1] to Sd[q][M] are serially supplied, and for example, the individual designation signal Sd[q][m] corresponding to the m-th stage is sequentially transferred from the transfer circuit SR[q][1] to the transfer circuit SR[q][m] in synchronization with the clock signal CL. Further, the latch circuit LT[q][m] latches the individual designation signal Sd[q][m] supplied to the transfer circuit SR[q][m] at the timing when the pulse PlsL of the latch signal LAT rises to the high level. Further, a decoder DC[q][m] generates the coupling state designation signals SLa[q][m], SLb[q][m], and SLs[q][m] based on the individual designation signal Sd[q][m], the latch signal LAT, the change signal CH, and the period designation signal Tsig[q].

FIG. 13 is an explanatory diagram for explaining the generation of the coupling state designation signals SLa[q1][*m*], SLb[q1][*m*], and SLs[q1][*m*] in a decoder DC[q1][*m*]. The decoder DC[q1][*m*] decodes the individual designation signal Sd[q1][*m*] according to FIG. 13, and generates the coupling state designation signals SLa[q1][*m*], SLb[q1][*m*], and SLs[q1][*m*].

As shown in FIG. 13, the individual designation signal Sd[q1][*m*] according to the embodiment indicates one of the value that designate the formation of the large dot (1, 1, 0), the value that designates the formation of the small dot (1, 0, 0), the value that designates the first micro-vibration waveform WHb (0, 1, 1), the value that designates the second micro-vibration waveform WLb (0, 0, 1), or the value that designate the actuation as the determination target ejection unit D[q1]-H (1, 1, 1). Then, when the individual designation signal Sd[q1][*m*] is (1, 1, 0), the decoder DC[q1][*m*] sets the coupling state designation signal SLa[q1][*m*] to the high level during the control period Tu1. When the individual designation signal Sd[q1][*m*] indicates (1, 0, 0), the decoder DC[q1][*m*] sets the coupling state designation signal SLb[q1][*m*] to the high level during the control period Tu1. When the individual designation signal Sd[q1][*m*] indicates (0, 1, 1), the decoder DC[q1][*m*] sets the coupling state designation signal SLa[q1][*m*] to the high level during the control period Tu2. When the individual designation signal Sd[q1][*m*] indicates (0, 0, 1), the decoder DC[q1][*m*] sets the coupling state designation signal SLb[q1][*m*] to the high level during the control period Tu2. When the individual designation signal Sd[q1][*m*] indicates (1, 1, 1), the decoder DC[q1][*m*] sets the coupling state designation signal SLa[q1][*m*] to the high level during the control periods TSS1 and TSS3, and sets the coupling state designation signal SLs[q1][*m*] to the high level during the control period TSS2. When the above does not apply, the decoder DC[q1][*m*] sets each signal to the low level.

FIG. 14 is an explanatory diagram for explaining the generation of the coupling state designation signals SLa[q2][*m*], SLb[q2][*m*], and SLs[q2][*m*] in a decoder DC[q2][*m*]. The decoder DC[q2][*m*] decodes the individual designation signal Sd[q2][*m*] according to FIG. 14, and generates the coupling state designation signals SLa[q2][*m*], SLb[q2][*m*], and SLs[q2][*m*].

As shown in FIG. 14, the individual designation signal Sd[q2][*m*] according to the embodiment indicates one of the value that designates the formation of large dot (1, 1, 0), the value that designates the formation of small dot (1, 0, 0), the value that designates the first micro-vibration waveform WHb (0, 1, 1), the value that designates the second micro-vibration waveform WLb (0, 0, 1), or the value that designates the actuation as the determination target ejection unit D[q2]-H (1, 1, 1). Then, when the individual designation signal Sd[q2][*m*] is (1, 1, 0), the decoder DC[q2][*m*] sets the coupling state designation signal SLa[q2][*m*] to the high level during the control period Tu1. When the individual designation signal Sd[q2][*m*] indicates (1, 0, 0), the decoder DC[q2][*m*] sets the coupling state designation signal SLb[q2][*m*] to the high level during the control period Tu1. When the individual designation signal Sd[q2][*m*] indicates (0, 1, 1), the decoder DC[q2][*m*] sets the coupling state designation signal SLa[q2][*m*] to the high level during the control period Tu3. When the individual designation signal Sd[q2][*m*] indicates (0, 0, 1), the decoder DC[q2][*m*] sets the coupling state designation signal SLb[q2][*m*] to the high level during the control period Tu3. When the individual designation signal Sd[q2][*m*] indicates (1, 1, 1), the decoder DC[q2][*m*] sets the coupling state designation signal SLa[m] to the high level during the control periods TSS4 and TSS6, and sets the coupling state designation signal SLs[q2][*m*] to the high level during the control period TSS5. When the above does not apply, the decoder DC[q2][*m*] sets each signal to the low level.

As described above, the detection circuit 20[*q*] generates the residual vibration signal NSAS based on the detection signal Vout. The residual vibration signal NSAS is a signal that amplifies the amplitude of the detection signal Vout and removes a noise component from the detection signal Vout to shape the detection signal Vout into a waveform suitable for performing the process in the ejection state determination circuit 64. The detection circuit 20[*q*] may includes, for example, a negative feedback type amplifier that amplifies the detection signal Vout, a low-pass filter that attenuates the high frequency component of the detection signal Vout, and a voltage follower that converts impedance to output the residual vibration signal NSAS of low impedance.

1.6. Ejection State Determination Circuit 64

Next, the ejection state determination circuit 64 will be described.

Generally, the residual vibration generated in the ejection unit D has a natural vibration frequency determined by the shape of the nozzle N, the weight of the ink with which the cavity 320 is filled, the viscosity of ink with which the cavity 320 is filled, and the like. Further, in general, the frequency of residual vibration when an ejection abnormality occurs in the ejection unit D because air bubbles are mixed in the cavity 320 of the ejection unit D is higher than that when no air bubbles are mixed in the cavity 320. Further, in general, the frequency of residual vibration when an ejection abnormality occurs in the ejection unit D because foreign matter such as paper dust is attached to the vicinity of the nozzle N of the ejection unit D is lower than that when the foreign matter is not attached. Further, in general, the frequency of residual vibration when an ejection abnormality occurs in the ejection unit D because the ink with which the cavity 320 of the ejection unit D is filled is thickened is lower than that when the ink is not thickened. In general, the frequency of residual vibration when an ejection abnormality occurs in the ejection unit D because the ink with which the cavity 320 of the ejection unit D is filled is thickened is lower than that when foreign matter such as paper dust is attached in the vicinity of the nozzle N of the ejection unit D. Further, in general, when an ejection abnormality occurs in the ejection unit D because the cavity 320 of the ejection unit D is not filled with ink or when an ejection abnormality occurs in the ejection unit D because the piezoelectric element PZ fails and cannot be displaced, the amplitude of the residual vibration is small.

As described above, the residual vibration signal NSAS indicates a waveform corresponding to the residual vibration generated in the determination target ejection unit D-H. Specifically, the residual vibration signal NSAS indicates a frequency corresponding to the frequency of the residual vibration generated in the determination target ejection unit D-H, and indicates a frequency corresponds to the amplitude of the residual vibration generated in the determination target ejection unit D-H. Therefore, the ejection state determination circuit 64 can perform an ejection state determination in which the ejection state of the ink in the determination target ejection unit D-H is determined based on the residual vibration signal NSAS.

The ejection state determination circuit 64 measures a time length NTc of one cycle of the residual vibration signal NSAS in the ejection state determination to generate cycle information Info-T indicating the measurement result. Further, the ejection state determination circuit 64 generates amplitude information Info-S indicating whether the residual vibration signal NSAS has a predetermined amplitude in the ejection state determination. Specifically, the ejection state determination circuit 64 determines whether the potential of the residual vibration signal NSAS is equal to or higher than a threshold value potential Vth-O higher than a potential Vth-C of the amplitude center level of the residual vibration signal NSAS, and is equal to or lower than a threshold value potential Vth-U lower than the potential Vth-C during the period in which the residual vibration signal NSAS is measured for the time length NTc of one cycle. Then, when the result of the determination is affirmative, the amplitude information Info-S is set to a value indicating that the residual vibration signal NSAS has a predetermined amplitude, for example, "1", and when the result of the determination is negative, the amplitude information Info-S is set to a value indicating that the residual vibration signal NSAS does not have a predetermined amplitude, for example, "0". Then, the ejection state determination circuit 64 generates the determination information Stt indicating the determination result of the ejection state the ink of in the determination target ejection unit D-H based on the cycle information Info-T and the amplitude information Info-S.

FIG. 15 is an explanatory diagram for explaining the generation of the determination information Stt in the ejection state determination circuit 64. As shown in FIG. 15, the ejection state determination circuit 64 compares the time length NTc indicated by the cycle information Info-T with part or all of a threshold value Tth1, a threshold value Tth2, and a threshold value Tth3 to determine the ejection state of the determination target ejection unit D-H, and generate the determination information Stt indicating the result of the determination. Here, the threshold value Tth1 is a value indicating the boundary between the time length of one cycle of residual vibration when the ejection state of the determination target ejection unit D-H is normal and the time of one cycle of residual vibration when air bubbles are mixed in the cavity 320. Further, the threshold value Tth2 is a value indicating the boundary between the time length of one cycle of residual vibration when the ejection state of the determination target ejection unit D-H is normal and the time length of one cycle of residual vibration when foreign matter is attached to the vicinity of the nozzle N. Further, the threshold value Tth3 is a value indicating the boundary between the time length of one cycle of residual vibration when foreign matter is attached to the vicinity of the nozzle N of the determination target ejection unit D-H and the time length of one cycle of residual vibration when the ink in the cavity 320 is thickened. The threshold value Tth1 to the threshold value Tth3 satisfy "Tth1<Tth2<Tth3".

As shown in FIG. 15, in the present embodiment, when the value of the amplitude information Info-S is "1" and the time length NTc indicated by the cycle information Info-T satisfies "Tth1≤NTc≤Tth2", the determination target ejection unit D-H is regarded to have a normal ink ejection state. Then, in this case, the ejection state determination circuit 64 sets the determination information Stt to a value "1" indicating that the ejection state of the determination target ejection unit D-H is normal. Further, when the value of the amplitude information Info-S is "1" and the time length NTc indicated by the cycle information Info-T satisfies "NTc<Tth1", the determination target ejection unit D-H is regarded to have an abnormal ejection due to air bubbles. Then, in this case, the ejection state determination circuit 64 sets the determination information Stt to a value "2" indicating that an ejection abnormality due to air bubbles has occurred in the determination target ejection unit D-H. Further, when the value of the amplitude information Info-S is "1" and the time length NTc indicated by the cycle information Info-T satisfies "Tth2<NTc≤Tth3", the determination target ejection unit D-H is regarded to have an abnormal ejection due to the adhesion of foreign matter. Then, in this case, the ejection state determination circuit 64 sets the determination information Stt to a value "3" indicating that an ejection abnormality has occurred due to the adhesion of foreign matter in the determination target ejection unit D-H. Further, when the value of the amplitude information Info-S is "1" and the time length NTc indicated by the cycle information Info-T satisfies "Tth3<NTc", the thickening is performed in the determination target ejection unit D-H is regarded to have an abnormal ejection due to thickening. Then, in this case, the ejection state determination circuit 64 sets the determination information Stt to a value "4" indicating that an ejection abnormality due to thickening has occurred in the determination target ejection unit D-H. Further, when the value of the amplitude information Info-S is "0", the determination target ejection unit D-H is regarded to have an abnormal ejection. Then, in this case, the ejection state determination circuit 64 sets the determination information Stt to a value "5" indicating that an ejection abnormality has occurred in the determination target ejection unit D-H. As described above, the ejection state determination circuit 64 generates the determination information Stt based on the cycle information Info-T and the amplitude information Info-S.

Then, the controller 60 stores the determination information Stt generated by the ejection state determination circuit 64 in the storage unit 61 in association with the q-th stage and the m-th stage of the determination target ejection unit D[q]-H corresponding to the determination information Stt. As a result, the controller 60 manages the determination information Stt[q][1] to Stt[q][M] corresponding to the ejection units D[q][1] to D[q][M], respectively. In the present embodiment, the case where the determination information Stt is information of five values from "1" to "5" is exemplified, but the determination information Stt may be information of two values indicating whether the time length NTc satisfies "Tth1≤NTc≤Tth2". At least, the determination information Stt may include information indicating whether the ink ejection state in the determination target ejection unit D-H is normal.

1.8. Summary of Embodiments

As described above, the ink jet printer 1 in the present embodiment includes the piezoelectric element PZ[q1][*m*1] that is actuated according to the supply of the drive signal ComA[q1] and the piezoelectric element PZ[q1][*m*2] that is actuated according to the supply of the drive signal ComB [q1]. The drive signal ComA[q1] in the control period Tu2 transitions from the reference potential V0 to the highest potential VHb in the period T2, maintains the highest potential VHb during the period T3 following the period T2, and transitions from the highest potential VHb to the reference potential V0 in the period T4 following the period T3. The drive signal ComB[q1] in the control period Tu2 transitions from the reference potential V0 to the lowest potential VLb in the period T2, maintains the lowest potential VLb during the period T3 following the period T2, and transitions from the lowest potential VLb to the reference potential V0 in the period T4 following the period T3. The highest potential VHb is higher than the reference potential V0, and the lowest potential VLb is lower than the reference potential V0. Generally, a magnetic field around a conductor changes due to a potential change in the conductor, and an induced current due to electromagnetic induction is generated in another conductor disposed in this magnetic field. This induced current may be noise and affect signals transmitted by other conductors. According to the present embodiment, in the period T2, the potential change of the wire 191-CA[q1] that transmits the drive signal ComA[q1] is in the positive direction while the potential change of the wire 191-CB[q1] that transmits the drive signal ComB[q1] is in the negative direction. Therefore, the change in the magnetic field generated around the wire 191-CA[q1] due to the potential change in the positive direction and the change in the magnetic field generated around the wire 191-CB[q1] due to the potential change in the negative direction offset each other. Since the changes in these two magnetic fields offset each other, it is possible to suppress the influence on the signal transmitted by the wires 191 disposed around the wire 191-CA[q1] and the wire 191-CB[q1].

Further, the absolute value of the potential difference dVH obtained by subtracting the reference potential V0 from the highest potential VHb and the absolute value of the potential difference dVL obtained by subtracting the reference potential V0 from the lowest potential VLb are substantially identical to each other. In the present embodiment, the magnitude of the change in the magnetic field generated around the wire 191-CA[q1] and the magnitude of the change in the magnetic field generated around the wire 191-CB[q1] are substantially identical to each other. Therefore, the influence on the signal transmitted by the wires 191 disposed around the wire 191-CA[q1] and the wire 191-CB [q1] according to the present embodiment can be suppressed, compared with the influence in the aspect in which the absolute value of the potential difference dVH is different from the absolute value of the potential difference dVL.

Further, the ink jet printer 1 includes the head unit HU[q1] including the piezoelectric element PZ[q1][*m*1] and the piezoelectric element PZ[q1][*m*2], and the FFC 19 including the wire 191-CA[q1] for supplying the drive signal ComA [q1] to the head unit HU[q1], and the wire 191-CB[q1] that supplies the drive signal ComB[q1] to the head unit HU[q1]. The head unit HU[q1] includes the switch SWa[q1][*m*1] that switches whether to electrically couple the wire 191-CA[q1] and the piezoelectric element PZ[q1][*m*1], and the switch SWb[q1][*m*2] that switches whether to electrically couple the wiring 191-CB[q1] and the piezoelectric element PZ[q1] [*m*2]. The FFC 19 includes the wire 191-SI that transmits the designation signal SI that designates the operations of the switch SWa[q1][*m*1] and the switch SWa[q1][*m*2]. According to the embodiment, the influence of the micro-vibration waveform on the designation signal SI can be suppressed. When noise due to the micro-vibration waveform affects the designation signal SI, ejection failure may occur. In the present embodiment, since the influence on the designation signal SI can be suppressed, ejection failure can be reduced.

Since the designation signal SI is a digital signal, it is less affected by noise than an analog signal. However, as the number of nozzles M increases, the current flowing through the wires 191 that transmits the drive signal Com increases, so that the change in the magnetic field of the wires 191 due to the potential change also increases, and the magnitude of the induced current also increases. As a result of the increased induced current, of the two signal levels of the high level and the low level, a signal level indicated by the potential of the original signal may be different from a signal level indicated by the potential of the original signal plus noise. In the embodiment, since the noise due to the micro-vibration waveform can be reduced, the influence of the micro-vibration waveform on the designation signal SI can be suppressed.

Further, the ink jet printer 1 includes the ejection unit D[q1][*m*1] and the ejection unit D[q1][*m*2]. The ejection unit D[q1][*m*1] includes the piezoelectric element PZ[q1] [*m*1], the cavity 320 whose volume changes as the piezoelectric element PZ[q1][*m*1] is actuated, and the nozzle N that communicates with the cavity 320, and that can eject the ink with which the cavity 320 is filled according to the change in the inside volume of the cavity 320. The ejection unit D[q1][*m*2] includes the piezoelectric element PZ[q1] [*m*2], the cavity 320 whose volume changes as the piezoelectric element PZ[q1][*m*2] is actuated, and the nozzle N that communicates with the cavity 320, and that can eject the ink with which the cavity 320 is filled according to the change in the inside volume of the cavity 320. The drive signal ComA[q1] actuates the piezoelectric element PZ[q1] [*m*1] so that the ink is not ejected from the ejection unit D[q1][*m*1] from the start of the period T2 to the end of the period T4. The drive signal ComA[q2] actuates the piezoelectric element PZ[q1][*m*2] so that the ink is not ejected from the ejection unit D[q1][*m*2] from the start of a period T7 to the end of a period T9. According to the embodiment, it is possible to suppress noise generated by the micro-vibration waveform while suppressing an increase in the viscosity of ink by the micro-vibration waveform.

In addition, according to the designer, the ink jet printer 1 includes the head unit HU[q1] including the piezoelectric element PZ[q1][*m*1] and the piezoelectric element PZ[q1] [*m*2], the head unit HU[q2] including the piezoelectric element PZ[q2][*m*3] that actuates according to the supply of the drive signal ComA[q2] or the drive signal ComB[q2], and the FFC 19 including the wire 191-CA[q1] and the wire 191-CB[q1]. The head unit HU[q2] includes the detection circuit 20[*q*2] that detects Vibration generated in the piezoelectric element PZ[q2][*m*3] due to actuation of the piezoelectric element PZ[q2][*m*3] by the drive signal ComA[q2] or the drive signal ComB[q2], and outputs the result of the detection as the residual vibration signal NSAS[q2][*m*3]. The FFC 19 includes the wire 191-N[q2] that transmits the residual vibration signal NSAS[q2][*m*3]. According to the embodiment, the influence of the micro-vibration waveform on the residual vibration signal NSAS can be suppressed. When noise affects the residual vibration signal NSAS, a poor determination of the ejection state may occur. Specifically, the poor determination refers to a determination in which the ejection state is determined to be abnormal even though the ejection state is normal, the ejection state is determined to be normal even though the ejection state is abnormal, or the determination is made so that the cause of the ejection abnormality is different from the actual cause. When it is determined that the ejection state is abnormal even though the ejection state is actually normal, the unnecessary maintenance process is executed. When it is determined that the ejection state is normal even though the ejection state is actually abnormal, the maintenance process is not executed, so that the ejection state cannot be restored. When the determined is made so that the cause of the ejection abnormality is different from the actual cause, the maintenance process according to the actual cause is not executed, so that the ejection state cannot be recovered.

The influence of noise on the residual vibration signal NSAS due to the micro-vibration waveform will be described with reference to FIGS. 16 and 17.

Figure 16:
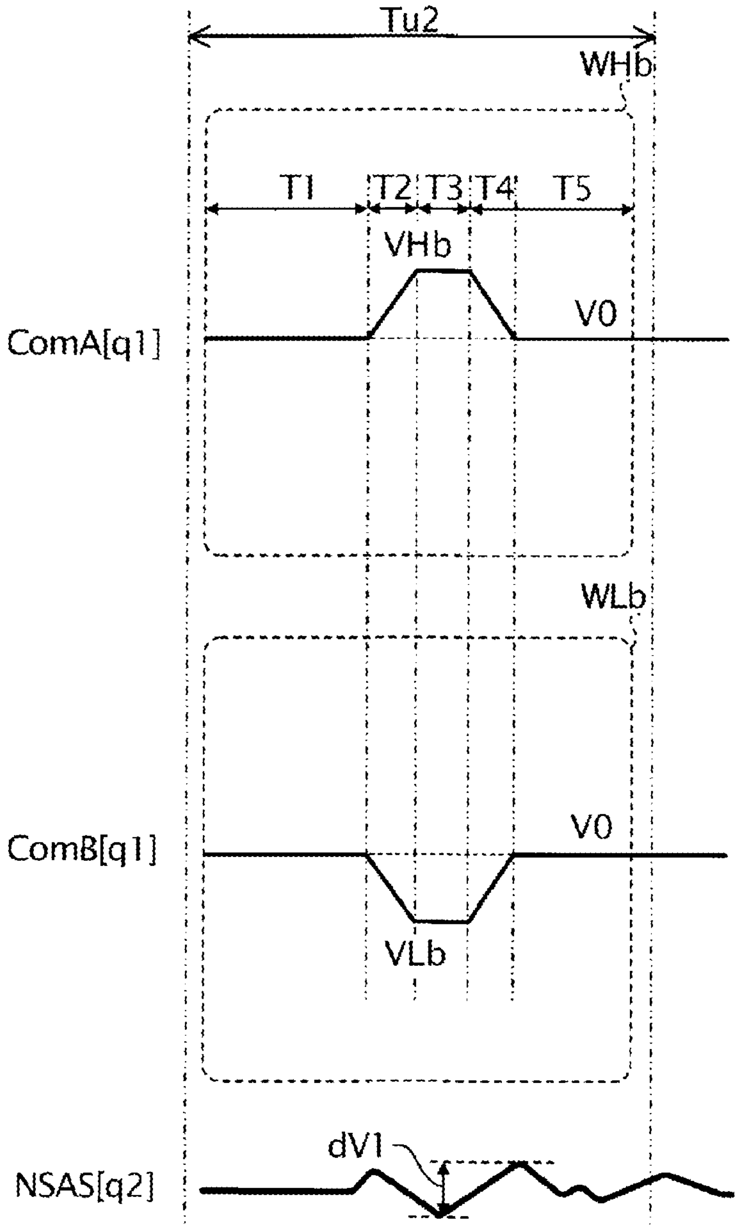
FIG. 16 is an explanatory diagram showing the influence of noise on a residual vibration signal NSAS due to a micro-vibration waveform in the present embodiment.

FIG. 16 is an explanatory diagram showing the influence of noise on the residual vibration signal NSAS due to the micro-vibration waveform in the present embodiment. In the control period Tu2, when the ejection unit D[q1][*m*1] is actuated by the drive signal ComA[q1] having the first micro-vibration waveform WHb, and the ejection unit D[q1][*m*2] is actuated by the drive signal ComB[q1] having the second micro-vibration waveform WLb, the residual vibration signal NSAS[q2][*m*3] has the waveform illustrated in FIG. 16. The potential difference between the highest potential and the lowest potential of the residual vibration signal NSAS[q2][*m*3] in the embodiment is a potential difference dV1. A potential difference dV1 is, for example, 130 mV.

Figure 17:
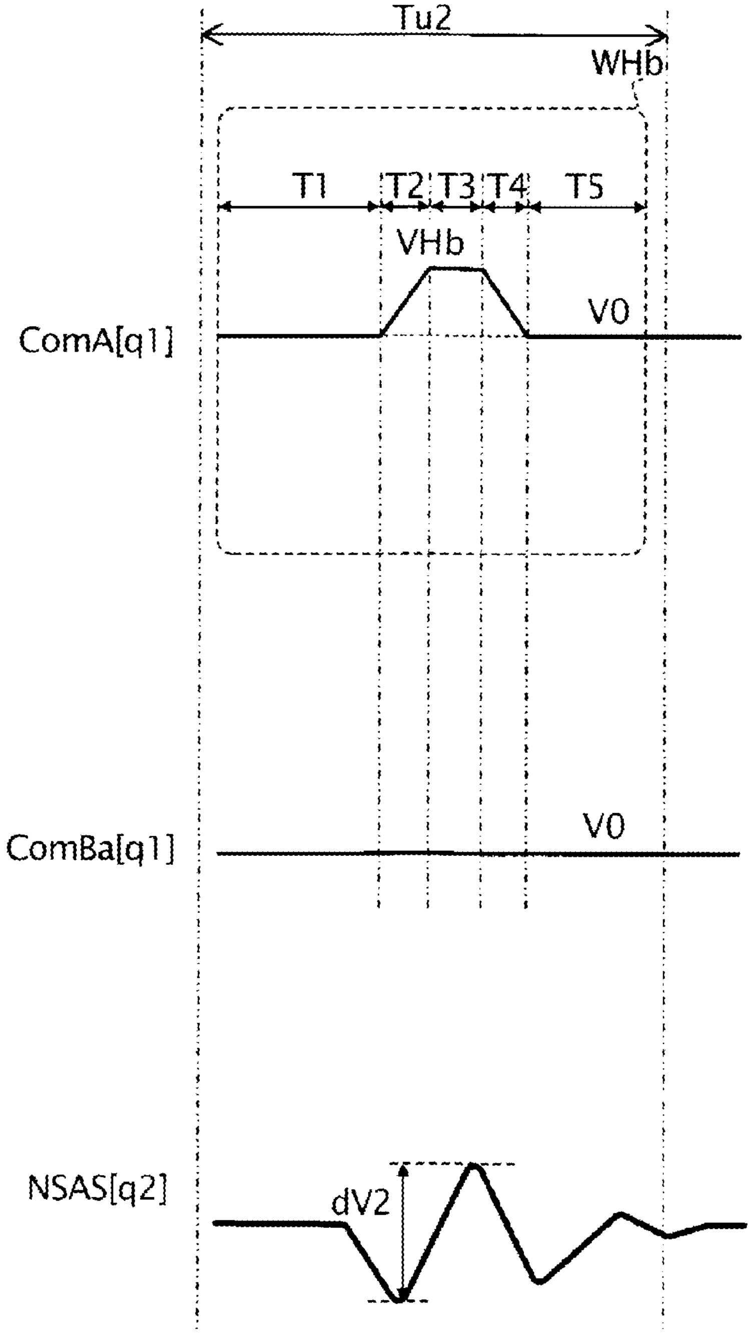
FIG. 17 is an explanatory diagram showing the influence of noise on the residual vibration signal NSAS due to the micro-vibration waveform in the reference example.

FIG. 17 is an explanatory diagram showing the influence of noise on the residual vibration signal NSAS due to the micro-vibration waveform in the reference example. In the reference example, in the control period Tu2, the drive signal ComA[q1] has the first micro-vibration waveform WHb, and the drive signal ComBa[q1] in the reference example does not have the second micro-vibration waveform WLb, and has no change in the potential difference. In the control period Tu2, when the ejection unit D[q1][*m*1] is actuated by the drive signal ComA[q1] having the first micro-vibration waveform WHb, the residual vibration signal NSAS[q2][*m*3] has an exemplary waveform shown in FIG. 16. The potential difference between the highest potential and the lowest potential of the residual vibration signal NSAS[q2][*m*3] in the reference example is a potential difference dV2. The potential difference dV2 is, for example, 450 mV.

As can be seen from FIGS. 16 and 17, the potential difference dV1 is smaller than the potential difference dV2. The reason why the potential difference dV1 is smaller than the potential difference dV2 will be described. In the embodiment, a magnetic field due to the first micro-vibration waveform WHb and a magnetic field due to the second micro-vibration waveform WLb are generated in the vicinity of the wire 191-N[q2] that transmits the residual vibration signal NSAS[q2]. In the vicinity of wire 191-N[q2], the directions of these two magnetic fields are reversed. Therefore, the changes in the magnetic field offset each other by the two reversed magnetic fields, so that the change in the magnetic field in the vicinity of the wire 191-N[q2] is small. As a result of the small change in the magnetic field, the induced current is also small, so that the potential difference dV1 is smaller than the potential difference dV2 where the magnetic fields do not offset each other out. Further, as shown in FIGS. 16 and 17, since the residual vibration signal NSAS is an analog signal, the influence of noise is larger than the influence of noise on a digital signal. Also, as can be understood from FIGS. 8 to 10, since the period from the start of the period T2 to the end of the period T4 and the period from the start of the period T7 to the end of the period T9 having the micro-vibration waveform in the head unit HU[q1] overlaps with the control period TSS5 in the head unit HU[q2], the noise generated by the micro-vibration waveform is included in the detection signal Vout[q2][*m*]. Therefore, according to the present embodiment, since the magnitude of noise is smaller than that of the reference example, it is possible to reduce the poor determination of the ejection state.

Further, the ink jet printer 1 includes the wire 191-CA[q1], the wire 191-CB[q1], the wire 191-V1[*q*1] electrically coupled to one end of the piezoelectric element PZ[q1][*m*1], and for holding one end of the piezoelectric element PZ[q1][*m*1] at the constant potential Vbs, and the wire 191-V2[*q*1] electrically coupled to one end of the piezoelectric element PZ[q1][*m*2], and for holding one end of the second piezoelectric element at the constant potential Vbs. The wire 191-CA[q1] and the wire 191-CB[q1] are disposed between the wire 191-V1[*q*1] and the wire 191-V2[*q*1]. According to the first embodiment, since the wire 191-CA[q1] and the wire 191-CB[q1] are disposed between the wire 191-V1[q1] and the wire 191-V2[*q*1], the influence of the micro-vibration waveform on the signal transmitted by the wires 191 disposed other than between the wire 191-V1[*q*1] and the wire 191-V2[*q*1] can be suppressed. The wires 191 disposed other than between the wire 191-V1[*q*1] and the wire 191-V2[q1] are the wire 191-SI and the 191-N[q1] in the example of FIG. 7.

2. Modification

The above-exemplified embodiments can be variously modified. A specific mode of modification is described below. Two or more embodiments arbitrarily selected from the following examples can be appropriately merged to the extent that they do not contradict each other.

2.1. First Modification

In the present embodiment, the timing of the potential change in the first micro-vibration waveform WHb and the timing of the potential change in the second micro-vibration waveform WLb are substantially identical to each other, but the present disclosure is not limited to this.

Figure 18:
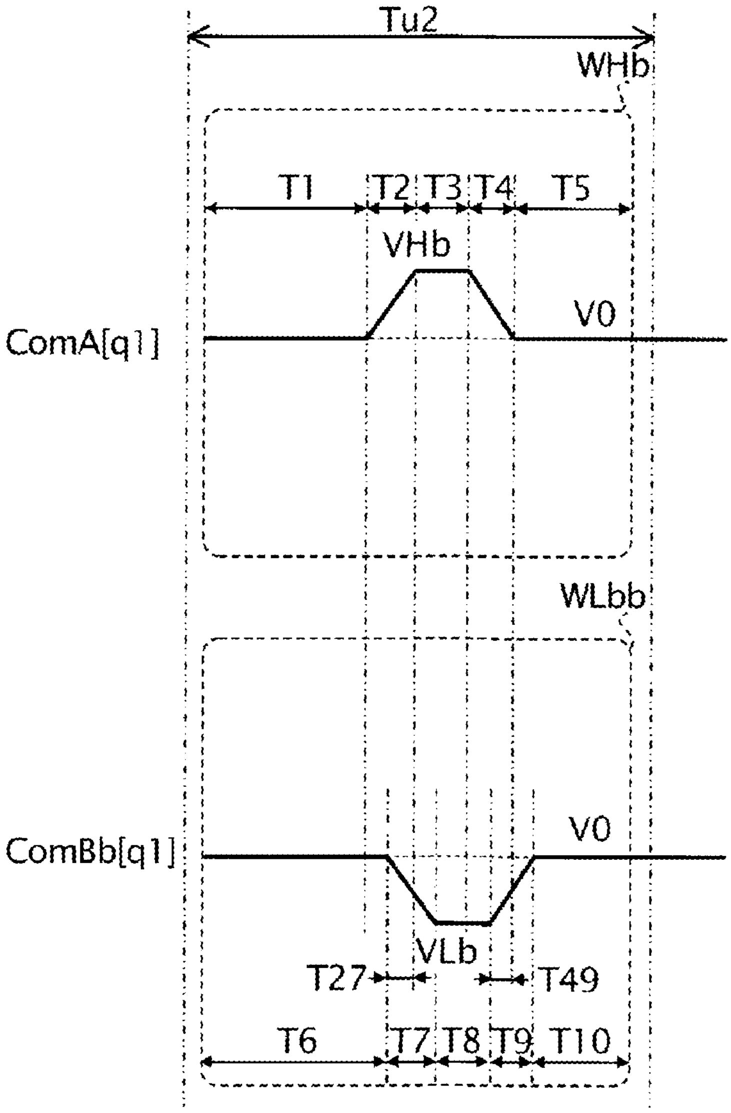
FIG. 18 is an explanatory diagram showing a first micro-vibration waveform WHb and a second micro-vibration waveform WLba in a first modification.

FIG. 18 is an explanatory diagram showing the first micro-vibration waveform WHb and a second micro-vibration waveform WLbb in the first modification. A drive signal ComBb[q1] in the first modification has the second micro-vibration waveform WLbb in the control period Tu2. The control period Tu2 is divided into a period T6, a period T7 following the period T6, a period T8 following the period T7, a period T9 following the period T8, and a period T10 following the period T9. During the period T6, the drive signal ComBb[q1] is held at the reference potential V0. In the period T7, the drive signal ComBb[q1] transitions from the reference potential V0 to the lowest potential VLb. During the period T8, the drive signal ComBb[q1] is held at the lowest potential VLb. In the period T8, the drive signal ComBb[q1] transitions from the lowest potential VLb to the reference potential V0. During the period T10, the drive signal ComBb[q1] is held at the reference potential V0. As illustrated in FIG. 18, the period T1 and the period T6 partially overlap with each other, the period T2 and the period T7 partially overlap with each other, the period T3 and the period T8 partially overlap with each other, the period T4 and the period T9 partially overlaps with each other, and the period T5 and the period T10 partially overlap with each other. For example, an overlapping period T27 illustrated in FIG. 18 is a period in which the period T2 and the period T7 overlap with each other, and an overlapping period T49 is a period in which the period T4 and the period T9 overlap with each other. The period T7 is an example of the “fourth period”, the period T8 is an example of the “fifth period”, and the period T9 is an example of the “sixth period”.

As in the present embodiment, in the overlapping period T27 and the overlapping period T49, the change in the magnetic field generated around the wire 191-CA[q1] due to the potential change in the positive direction and the change in the magnetic field generated around the wire 191-CB[q1] due to the potential change in the negative direction offset each other. Since the changes in the two magnetic fields offset each other, it is possible to suppress the influence on the signal transmitted by the wiring disposed around the wire 191-CA[q1] and the wire 191-CB[q1]. Here, as the period in which the period T2 and the period T7 overlap increases, the period in which the two magnetic fields offset each other increases. Therefore, it is preferable that the period T2 and the period T7 overlap with each other for a long period of time, and an embodiment in which the period T2 and the period T7 are substantially identical to each other is most preferable. As in the period T2 and the period T7, for the period T4 and the period T9, it is preferable that the period T4 and the period T9 overlap with each other for a long period of time, and an embodiment in which the period T4 and the period T9 are substantially identical to each other is most preferable.

2.2. Second Modification

In the present embodiment, the absolute value of the potential difference dVH obtained by subtracting the reference potential V0 from the highest potential VHb and the absolute value of the potential difference dVL obtained by subtracting the reference potential V0 from the lowest potential VLb are substantially identical to each other, but may be different. However, the magnitude of the change in the magnetic field generated around the wire 191-CA[q1] approaches the magnitude of the change in the magnetic field generated around the wire 191-CB[q1] as the absolute values of the two potential differences approach each other. Therefore, it is preferable that the absolute value of the potential difference dVH and the absolute value of the potential difference dVL are close to each other, and an embodiment in which they are substantially identical is most preferable.

2.3. Third Modification

In the present embodiment, the reference potential V0 is an example of the “first potential” and the “third potential”, in other words, the reference potential of the drive signal ComA[q1] is identical to the reference potential of the drive signal ComB[q1], but the present disclosure is not limited to this. For example, the reference potential of the drive signal ComA[q1] may be different from the reference potential of the drive signal ComB[q1].

2.4. Fourth Modification

In the present embodiment, description is made in which the piezoelectric element PZ[q1][*m*1] is an example of the “first piezoelectric element”, and the piezoelectric element PZ[q1][*m*2] is an example of the “second piezoelectric element”. That is, in the present embodiment, the first piezoelectric element and the second piezoelectric element are included in the same head unit HU, but the first piezoelectric element and the second piezoelectric element may be included in different head units HU. For example, the piezoelectric element PZ[q1][*m*1] may be an example of the “first piezoelectric element”, and the piezoelectric element PZ[q3][*m*5] may be an example of the “second piezoelectric element”. The variable q3 is an integer from 1 to Q, and is an integer different from the variable q1. The variable m5 is an integer from 1 to M. Then, the drive signal ComA[q1] supplied to the piezoelectric element PZ[q1][*m*1] has the first micro-vibration waveform WHb in the control period Tu2, and the drive signal ComA[q3] supplied to the piezoelectric element PZ[q3][*m*5] has the second micro-vibration waveform WLb in the control period Tu2, so that it is possible to suppress the influence on the signal transmitted by the wiring disposed in the vicinity of the wires 191 that transmit the drive signal ComA[q1] and the wire 191 that transmit the drive signal ComA[q3].

2.5. Fifth Modification

In the present embodiment, description is made in which the influence of the micro-vibration waveform on the designation signal SI and the influence of the micro-vibration waveform on the residual vibration signal NSAS can be suppressed. However, the signal on which the influence of the micro-vibration waveform is suppressed is not limited to the designation signal SI and the residual vibration signal NSAS. Specifically, the influence of the micro-vibration waveform can be suppressed on the clock signal CL, the latch signal LAT, the change signal CH, and the period designation signal Tsig.

2.6. Sixth Modification

In the present embodiment, description is made in which the number Q of the head units HU is an even number of 2 or more, but may be an odd number of 3 or more. For example, when the number Q is 3, the drive signal generation circuits 62[1] and 62[3] may generate the drive signal Com[q1] shown in FIG. 9, and the drive signal generation circuit 62[2] may generate the drive signal Com[q2] shown in FIG. 9.

2.7. Seventh Modification

In each of the above-described aspects, the serial ink jet printer 1 in which the transport body 82 accommodating the head module HM is reciprocated in the X axis direction is exemplified, but the present disclosure is not limited to such an aspect. The ink jet printer may be a line ink jet printer in which a plurality of nozzles N is distributed over the entire width of the recording paper P. In the line ink jet printer, since the head module HM does not move, it is not necessary to include the FFC 19. For example, in the line ink jet printer, instead of the FFC 19, a rigid substrate on which the wire 191-CA[q] that transmits the drive signal ComA[q] and the wire 191-CA[q] that transmits the drive signal ComB[q] are disposed is included.

2.8. Eighth Modification

The ink jet printer illustrated in each of the above-described aspects can be employed in various devices such as a facsimile machine and a copier, in addition to a device dedicated to printing. Further, the application of the liquid ejection apparatus of the present disclosure is not limited to printing. For example, a liquid ejection apparatus that ejects a solution of a coloring material is used as a manufacturing device that forms a color filter for a liquid crystal display device. Further, a liquid ejection apparatus that ejects a solution of a conductive material is used as a manufacturing device that forms wiring on a wiring substrate and electrodes.

2.9. Ninth Modification

In each of the above-described aspects, the ink jet printer 1 having two piezoelectric elements PZ is described as an example. Further, each of the above-described aspects can also be applied to a capacitive load drive circuit having two piezoelectric elements. Examples of the capacitive load drive circuits include, for example, a fingerprint sensor, an echo system, and mammography.

As in the ink jet printer 1, in the capacitive load drive circuit, one of the two piezoelectric elements, the first piezoelectric element, is actuated according to a supply of the first drive signal. The other of the two piezoelectric elements, the second piezoelectric element, is actuated according to the supply of the other second drive signal. The first drive signal transitions from the first potential to the second potential in the first period, maintains the second potential during the second period following the first period, and transitions from the second potential to the first potential in the third period following the second period. The second drive signal transitions from the third potential to the fourth potential in the fourth period, maintains the fourth potential during the fifth period following the fourth period, and transitions from the fourth potential to the third potential in in the sixth period following the fifth period. The first period and the fourth period partially or completely overlap with each other, the third period and the sixth period partially or completely overlap with each other, the second potential is higher than the first potential, and the fourth potential is lower than the third potential.

The capacitive load drive circuit includes a head unit including a first piezoelectric element and a second piezoelectric element, and a flexible flat cable including first wiring for supplying a first drive signal to the head unit, and second wiring for supplying a second drive signal to the head unit. The head unit includes a first switch that switches whether to electrically couple the first wiring and the first piezoelectric element, and a second switch that switches whether to electrically couple the second wiring and the second piezoelectric element. The flexible flat cable includes control wiring that transmits a designation signal that designates the operations of the first switch and the second switch.

The flexible flat cable included in the capacitive load drive circuit includes third wiring electrically coupled to one end of the first piezoelectric element, and for holding one end of the first piezoelectric element at a constant potential, and fourth wiring electrically coupling to one end of the second piezoelectric element, and for holding one end of the second piezoelectric element at a constant potential. The first wiring and the second wiring are disposed between the third wiring and the fourth wiring.

What is claimed is:

1. A liquid ejection apparatus comprising:
- a head unit including
  - a first piezoelectric element that is actuated according to a first drive signal and a second drive signal that are selectively supplied to the first piezoelectric element, and
  - a second piezoelectric element that is actuated according to the first drive signal and the second drive signal that are selectively supplied to the second piezoelectric element; and
- a flexible flat cable including
  - first wiring electrically connectable to the first piezoelectric element and the second piezoelectric element for selectively supplying the first drive signal to the first piezoelectric element and the second piezoelectric element,
  - second wiring electrically connectable to the first piezoelectric element and the second piezoelectric element for selectively supplying the second drive signal to the first piezoelectric element and the second piezoelectric element,
  - third wiring that is electrically coupled to one end of the first piezoelectric element and holds the one end of the first piezoelectric element at a constant potential, and
  - fourth wiring that is electrically coupled to one end of the second piezoelectric element and holds the one end of the second piezoelectric element at a constant potential, wherein
- the first drive signal
  - transitions from a first potential to a second potential in a first period,
  - maintains the second potential during a second period following the first period, and
  - transitions from the second potential to the first potential in a third period following the second period,
- the second drive signal
  - transitions from a third potential to a fourth potential in a fourth period,
  - maintains the fourth potential during a fifth period following the fourth period, and
  - transitions from the fourth potential to the third potential in a sixth period following the fifth period,
- the first period and the fourth period overlap with each other in part or in whole,
- the third period and the sixth period overlap with each other in part or in whole,
- the second potential is higher than the first potential,
- the fourth potential is lower than the third potential, and
- the first wiring and the second wiring are both disposed between the third wiring and the fourth wiring.

2. The liquid ejection apparatus according to claim 1, wherein
- an absolute value of a potential difference obtained by subtracting the first potential from the second potential and an absolute value of a potential difference obtained by subtracting the third potential from the fourth potential are substantially identical to each other.

3. The liquid ejection apparatus according to claim 1, wherein
- the first period and the fourth period are substantially an identical period, and
- the third period and the sixth period are substantially an identical period.

4. The liquid ejection apparatus according to claim 1, wherein
- the head unit includes
  - a first switch that switches whether to electrically couple the first wiring and the first piezoelectric element, and
  - a second switch that switches whether to electrically couple the second wiring and the second piezoelectric element, and
- the flexible flat cable includes control wiring that transmits a designation signal that designates operations of the first switch and the second switch.

5. The liquid ejection apparatus according to claim 1, further comprising:

an additional head unit including a third piezoelectric element that is actuated according to a supply of a third drive signal, and a detection unit that detects vibration generated in the third piezoelectric element upon actuation of the third piezoelectric element by the third drive signal to output a result of the detection as a detection signal, wherein the flexible flat cable includes detection wiring that transmits the detection signal.

6. The liquid ejection apparatus according to claim 1, wherein the first wiring and the second wiring are directly adjacent to each other between the third wiring and the fourth wiring.

7. A capacitive load drive circuit comprising:

a head unit including a first piezoelectric element that is actuated according to a first drive signal and a second drive signal that are selectively supplied to the first piezoelectric element, and a second piezoelectric element that is actuated according to the first drive signal and the second drive signal that are selectively supplied to the second piezoelectric element; and a flexible flat cable including first wiring electrically connectable to the first piezoelectric element and the second piezoelectric element for selectively supplying the first drive signal to the first piezoelectric element and the second piezoelectric element, second wiring electrically connectable to the first piezoelectric element and the second piezoelectric element for selectively supplying the second drive signal to the first piezoelectric element and the second piezoelectric element, third wiring that is electrically coupled to one end of the first piezoelectric element and holds the one end of the first piezoelectric element at a constant potential, and fourth wiring that is electrically coupled to one end of the second piezoelectric element and holds the one end of the second piezoelectric element at a constant potential, wherein the first drive signal transitions from a first potential to a second potential in a first period, maintains the second potential during a second period following the first period, and transitions from the second potential to the first potential in a third period following the second period, the second drive signal transitions from a third potential to a fourth potential in a fourth period, maintains the fourth potential during a fifth period following the fourth period, and transitions from the fourth potential to the third potential in a sixth period following the fifth period, the first period and the fourth period overlap with each other in part or in whole, the third period and the sixth period overlap with each other in part or in whole, the second potential is higher than the first potential, the fourth potential is lower than the third potential, and the first wiring and the second wiring are both disposed between the third wiring and the fourth wiring.

8. The capacitive load drive circuit according to claim 7, wherein the head unit includes a first switch that switches whether to electrically couple the first wiring and the first piezoelectric element, and a second switch that switches whether to electrically couple the second wiring and the second piezoelectric element, and the flexible flat cable includes control wiring that transmits a designation signal that designates operations of the first switch and the second switch.

9. The capacitive load drive circuit according to claim 7, wherein the first wiring and the second wiring are directly adjacent to each other between the third wiring and the fourth wiring.

10. A liquid ejection apparatus comprising:

a first piezoelectric element that is actuated according to a supply of a first drive signal;

a second piezoelectric element that is actuated according to a supply of a second drive signal;

a first ejection unit including the first piezoelectric element, a first pressure chamber whose volume changes as the first piezoelectric element is actuated, and a first nozzle configured to eject, according to a change in an inside volume of the first pressure chamber, a liquid with which the first pressure chamber is filled, the first nozzle communicating with the first pressure chamber; and a second ejection unit including the second piezoelectric element, a second pressure chamber whose volume changes as the second piezoelectric element is actuated, and a second nozzle configured to eject, according to a change in an inside volume of the second pressure chamber, a liquid with which the second pressure chamber is filled, the second nozzle communicating with the second pressure chamber, wherein the first drive signal transitions from a first potential to a second potential in a first period, maintains the second potential during a second period following the first period, and transitions from the second potential to the first potential in a third period following the second period, the second drive signal transitions from a third potential to a fourth potential in a fourth period, maintains the fourth potential during a fifth period following the fourth period, and transitions from the fourth potential to the third potential in a sixth period following the fifth period, the first period and the fourth period overlap with each other in part or in whole, the third period and the sixth period overlap with each other in part or in whole, the second potential is higher than the first potential, the fourth potential is lower than the third potential, the first drive signal actuates the first piezoelectric element from a start of the first period to an end of the third period so that a liquid is not ejected from the first ejection unit, and the second drive signal actuates the second piezoelectric element from a start of the fourth period to an end of the sixth period so that a liquid is not ejected from the second ejection unit.

* * * * *